US012664565B1

(12) United States Patent
Xu et al.

(10) Patent No.: US 12,664,565 B1
(45) Date of Patent: \*Jun. 23, 2026

(54) SYSTEMS AND METHODS OF A TRACKING ANALYTICS PLATFORM

(71) Applicant: Experian Marketing Solutions, LLC, Schaumburg, IL (US)

(72) Inventors: Kangkang Xu, Naperville, IL (US); Sunaina Chaudhary, Irvine, CA (US); Brian A. Davis, Plainfield, IL (US)

(73) Assignee: Experian Marketing Solutions, LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/941,922

(22) Filed: Nov. 8, 2024

Related U.S. Application Data

(63) Continuation of application No. 18/142,953, filed on May 3, 2023, now Pat. No. 12,175,496, which is a
(Continued)

(51) Int. Cl.
*G06Q 30/02* (2023.01)
*G06Q 30/0201* (2023.01)
*G06Q 30/0251* (2023.01)

(52) U.S. Cl.
CPC ..... *G06Q 30/0255* (2013.01); *G06Q 30/0201* (2013.01); *G06Q 30/0261* (2013.01)

(58) Field of Classification Search
None
See application file for complete search history.

(56) References Cited

U.S. PATENT DOCUMENTS

| | | | |
|---|---|---|---|
| 4,775,935 | A | 10/1988 | Yourick |
| 4,982,346 | A | 1/1991 | Girouard et al. |

(Continued)

FOREIGN PATENT DOCUMENTS

| | | |
|---|---|---|
| CA | 2 865 348 | 3/2015 |
| CA | 2 942 328 | 4/2020 |

(Continued)

OTHER PUBLICATIONS

U.S. Appl. No. 12/705,489, filed Feb. 12, 2010, Bargoli et al.
(Continued)

*Primary Examiner* — Vincent M Cao
(74) *Attorney, Agent, or Firm* — KNOBBE, MARTENS, OLSON & BEAR, LLP

(57) ABSTRACT

In one embodiment, an analytics tracking system is disclosed that comprises an interface in electronic communication with one or more consumer devices configured to enable a corresponding consumer to access the interface via a mobile application. The system further comprises a consumer data store comprising data regarding at least one consumer, a movement data store comprising data regarding locations and/or movement of the at least one consumer, and an online behavior data (OBD) data store comprising data associated with browsing and/or application data histories of the at least one consumer. The system further comprises a dynamic analysis system configured to analyze data from the consumer data store, the movement data store, and the OBD data store to generate at least one of custom information for the at least one consumer or identify a location for presentation of information to the at least one consumer.

20 Claims, 4 Drawing Sheets

Related U.S. Application Data continuation of application No. 17/144,023, filed on Jan. 7, 2021, now Pat. No. 11,682,041.

(60) Provisional application No. 62/960,649, filed on Jan. 13, 2020.

(56) References Cited

U.S. PATENT DOCUMENTS

| | | | |
|---|---|---|---|
| 5,201,010 A | 4/1993 | Deaton et al. |
| 5,274,547 A | 12/1993 | Zoffel et al. |
| 5,283,731 A | 2/1994 | Lalonde et al. |
| 5,305,195 A | 4/1994 | Murphy |
| 5,325,509 A | 6/1994 | Lautzenheiser |
| 5,347,632 A | 9/1994 | Filepp et al. |
| 5,454,030 A | 9/1995 | de Oliveira et al. |
| 5,459,306 A | 10/1995 | Stein et al. |
| 5,504,675 A | 4/1996 | Cragun et al. |
| 5,515,098 A | 5/1996 | Carles |
| 5,560,008 A | 9/1996 | Johnson et al. |
| 5,563,783 A | 10/1996 | Stolfo et al. |
| 5,583,380 A | 12/1996 | Larsen et al. |
| 5,592,560 A | 1/1997 | Deaton et al. |
| 5,627,973 A | 5/1997 | Armstrong et al. |
| 5,629,982 A | 5/1997 | Micali |
| 5,630,127 A | 5/1997 | Moore et al. |
| 5,649,114 A | 7/1997 | Deaton et al. |
| 5,661,516 A | 8/1997 | Carles |
| 5,689,565 A | 11/1997 | Spies et al. |
| 5,696,898 A | 12/1997 | Baker et al. |
| 5,696,907 A | 12/1997 | Tom |
| 5,717,923 A | 2/1998 | Dedrick |
| 5,724,521 A | 3/1998 | Dedrick |
| 5,740,549 A | 4/1998 | Reilly et al. |
| 5,745,654 A | 4/1998 | Titan |
| 5,745,694 A | 4/1998 | Egawa et al. |
| 5,774,357 A | 6/1998 | Hoffberg et al. |
| 5,774,868 A | 6/1998 | Cragun et al. |
| 5,774,870 A | 6/1998 | Storey |
| 5,809,481 A | 9/1998 | Baton et al. |
| 5,819,092 A | 10/1998 | Ferguson et al. |
| 5,819,226 A | 10/1998 | Gopinathan et al. |
| 5,823,879 A | 10/1998 | Goldberg et al. |
| 5,825,884 A | 10/1998 | Zdepski et al. |
| 5,828,837 A | 10/1998 | Eikland |
| 5,848,396 A | 12/1998 | Gerace |
| 5,857,175 A | 1/1999 | Day et al. |
| 5,864,822 A | 1/1999 | Baker, III |
| 5,870,721 A | 2/1999 | Norris |
| 5,873,068 A | 2/1999 | Beaumont et al. |
| 5,889,799 A | 3/1999 | Grossman et al. |
| 5,889,958 A | 3/1999 | Willens |
| 5,890,140 A | 3/1999 | Clark et al. |
| 5,907,608 A | 5/1999 | Shaffer et al. |
| 5,907,830 A | 5/1999 | Engel et al. |
| 5,912,839 A | 6/1999 | Ovshinsky et al. |
| 5,915,243 A | 6/1999 | Smolen |
| 5,918,014 A | 6/1999 | Robinson et al. |
| 5,924,082 A | 7/1999 | Silverman et al. |
| 5,930,764 A | 7/1999 | Melchione et al. |
| 5,930,776 A | 7/1999 | Dykstra et al. |
| 5,933,811 A | 8/1999 | Angles et al. |
| 5,933,813 A | 8/1999 | Teicher et al. |
| 5,944,790 A | 8/1999 | Levy |
| 5,948,061 A | 9/1999 | Merriman et al. |
| 5,953,707 A | 9/1999 | Huang et al. |
| 5,961,593 A | 10/1999 | Gabber et al. |
| 5,966,695 A | 10/1999 | Melchione et al. |
| 5,974,396 A | 10/1999 | Anderson et al. |
| 5,991,735 A | 11/1999 | Gerace |
| 6,014,688 A | 1/2000 | Venkatraman et al. |
| 6,026,368 A | 2/2000 | Brown et al. |
| 6,029,139 A | 2/2000 | Cunningham et al. |
| 6,044,357 A | 3/2000 | Garg |
| 6,055,573 A | 4/2000 | Gardenswartz et al. |
| 6,061,658 A | 5/2000 | Chou et al. |
| 6,061,691 A | 5/2000 | Fox |
| 6,064,973 A | 5/2000 | Smith et al. |
| 6,070,142 A | 5/2000 | McDonough et al. |
| 6,070,147 A | 5/2000 | Harms et al. |
| 6,073,241 A | 6/2000 | Rosenberg et al. |
| 6,078,892 A | 6/2000 | Anderson et al. |
| 6,085,169 A | 7/2000 | Walker et al. |
| 6,101,486 A | 8/2000 | Roberts et al. |
| 6,115,693 A | 9/2000 | McDonough et al. |
| 6,144,948 A | 11/2000 | Walker et al. |
| 6,178,442 B1 | 1/2001 | Yamazaki |
| 6,202,053 B1 | 3/2001 | Christiansen et al. |
| 6,205,432 B1 | 3/2001 | Gabbard et al. |
| 6,208,979 B1 | 3/2001 | Sinclair |
| 6,209,033 B1 | 3/2001 | Datta et al. |
| 6,233,566 B1 | 5/2001 | Levine et al. |
| 6,236,977 B1 | 5/2001 | Verba |
| 6,269,343 B1 | 7/2001 | Pallakoff |
| 6,289,318 B1 | 9/2001 | Barber |
| 6,298,330 B1 | 10/2001 | Gardenswartz et al. |
| 6,308,210 B1 | 10/2001 | Fields et al. |
| 6,317,752 B1 | 11/2001 | Lee et al. |
| 6,324,566 B1 | 11/2001 | Himmel et al. |
| 6,330,546 B1 | 12/2001 | Gopinathan et al. |
| 6,334,110 B1 | 12/2001 | Walter et al. |
| 6,385,592 B1 | 5/2002 | Angles et al. |
| 6,385,594 B1 | 5/2002 | Lebda et al. |
| 6,412,012 B1 | 6/2002 | Bieganski et al. |
| 6,424,956 B1 | 7/2002 | Werbos |
| 6,442,529 B1 | 8/2002 | Krishan et al. |
| 6,442,577 B1 | 8/2002 | Britton et al. |
| 6,445,975 B1 | 9/2002 | Ramsey |
| 6,460,036 B1 | 10/2002 | Herz |
| 6,477,509 B1 | 11/2002 | Hammons et al. |
| 6,487,538 B1 | 11/2002 | Gupta et al. |
| 6,505,168 B1 | 1/2003 | Rothman et al. |
| 6,513,018 B1 | 1/2003 | Culhane |
| 6,546,257 B1 | 4/2003 | Stewart et al. |
| 6,549,944 B1 | 4/2003 | Weinberg et al. |
| 6,604,089 B1 | 8/2003 | Van Horn et al. |
| 6,606,744 B1 | 8/2003 | Mikurak |
| 6,611,816 B2 | 8/2003 | Lebda et al. |
| 6,615,247 B1 | 9/2003 | Murphy |
| 6,623,529 B1 | 9/2003 | Lakritz |
| 6,631,356 B1 | 10/2003 | Van Horn et al. |
| 6,633,850 B1 | 10/2003 | Gabbard et al. |
| 6,640,215 B1 | 10/2003 | Galperin et al. |
| 6,665,715 B1 | 12/2003 | Houri |
| 6,671,818 B1 | 12/2003 | Mikurak |
| 6,698,020 B1 | 2/2004 | Zigmond et al. |
| 6,748,426 B1 | 6/2004 | Shaffer et al. |
| 6,757,740 B1 | 6/2004 | Parekh et al. |
| 6,801,909 B2 | 10/2004 | Delgado et al. |
| 6,810,356 B1 | 10/2004 | Garcia-Franco et al. |
| 6,839,682 B1 | 1/2005 | Blume et al. |
| 6,847,934 B1 | 1/2005 | Lin et al. |
| 6,873,979 B2 | 3/2005 | Fishman et al. |
| 6,901,406 B2 | 5/2005 | Nabe et al. |
| 6,915,269 B1 | 7/2005 | Shapiro et al. |
| 6,925,441 B1 | 8/2005 | Jones et al. |
| 6,959,281 B1 | 10/2005 | Freeling et al. |
| 6,970,830 B1 | 11/2005 | Samra et al. |
| 6,983,478 B1 | 1/2006 | Grauch et al. |
| 6,993,493 B1 | 1/2006 | Galperin et al. |
| 7,003,792 B1 | 2/2006 | Yuen |
| 7,013,285 B1 | 3/2006 | Rebane |
| 7,023,980 B2 | 4/2006 | Lenard |
| 7,031,945 B1 | 4/2006 | Donner |
| 7,033,792 B2 | 4/2006 | Zhong et al. |
| 7,039,607 B2 | 5/2006 | Watarai et al. |
| 7,047,251 B2 | 5/2006 | Reed et al. |
| 7,050,989 B1 | 5/2006 | Hurt et al. |
| 7,054,828 B2 | 5/2006 | Heching et al. |
| 7,072,853 B2 | 7/2006 | Shkedi |
| 7,072,963 B2 | 7/2006 | Anderson et al. |
| 7,076,442 B2 | 7/2006 | Lin et al. |
| 7,080,027 B2 | 7/2006 | Luby et al. |
| 7,085,734 B2 | 8/2006 | Grant et al. |
| 7,117,172 B1 | 10/2006 | Black |

(56) References Cited

U.S. PATENT DOCUMENTS

| | | | |
|---|---|---|---|
| 7,136,448 B1 | 11/2006 | Venkataperumal et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,155,508 B2 | 12/2006 | Sankuratripati et al. |
| 7,165,037 B2 | 1/2007 | Lazarus et al. |
| 7,185,353 B2 | 2/2007 | Schlack |
| 7,191,144 B2 | 3/2007 | White |
| 7,194,420 B2 | 3/2007 | Ikezawa et al. |
| 7,212,979 B1 | 5/2007 | Matz et al. |
| 7,240,059 B2 | 7/2007 | Bayliss et al. |
| 7,243,075 B1 | 7/2007 | Shaffer et al. |
| 7,249,048 B1 | 7/2007 | O'Flaherty |
| 7,275,083 B1 | 9/2007 | Seibel et al. |
| 7,296,734 B2 | 11/2007 | Pliha |
| 7,305,364 B2 | 12/2007 | Nabe et al. |
| 7,308,418 B2 | 12/2007 | Malek et al. |
| 7,310,617 B1 | 12/2007 | Cunningham |
| 7,313,538 B2 | 12/2007 | Wilmes et al. |
| 7,313,622 B2 | 12/2007 | Lee et al. |
| 7,314,166 B2 | 1/2008 | Anderson et al. |
| 7,328,169 B2 | 2/2008 | Temares et al. |
| 7,343,294 B1 | 3/2008 | Sandholm et al. |
| 7,346,540 B2 | 3/2008 | Lin et al. |
| 7,363,308 B2 | 4/2008 | Dillon et al. |
| 7,366,694 B2 | 4/2008 | Lazerson |
| 7,370,057 B2 | 5/2008 | Burdick et al. |
| 7,376,603 B1 | 5/2008 | Mayr et al. |
| 7,376,714 B1 | 5/2008 | Gerken |
| 7,386,786 B2 | 6/2008 | Davis et al. |
| 7,392,203 B2 | 6/2008 | Edison et al. |
| 7,424,439 B1 | 9/2008 | Fayyad et al. |
| 7,428,526 B2 | 9/2008 | Miller et al. |
| 7,444,302 B2 | 10/2008 | Hu et al. |
| 7,451,095 B1 | 11/2008 | Bradley et al. |
| 7,458,508 B1 | 12/2008 | Shao et al. |
| 7,467,106 B1 | 12/2008 | Levine et al. |
| 7,472,088 B2 | 12/2008 | Taylor et al. |
| 7,499,868 B2 | 3/2009 | Galperin et al. |
| 7,529,689 B2 | 5/2009 | Rowan |
| 7,546,266 B2 | 6/2009 | Beirne et al. |
| 7,546,619 B2 | 6/2009 | Anderson et al. |
| 7,556,192 B2 | 7/2009 | Wokaty, Jr. |
| 7,562,184 B2 | 7/2009 | Henmi et al. |
| 7,565,153 B2 | 7/2009 | Alcock et al. |
| 7,571,139 B1 | 8/2009 | Giordano et al. |
| 7,580,856 B1 | 8/2009 | Pliha |
| 7,584,126 B1 | 9/2009 | White |
| 7,590,589 B2 | 9/2009 | Hoffberg |
| 7,593,893 B1 | 9/2009 | Ladd et al. |
| 7,606,778 B2 | 10/2009 | Dewar |
| 7,610,257 B1 | 10/2009 | Abrahams |
| 7,617,136 B1 | 11/2009 | Lessing et al. |
| 7,617,160 B1 | 11/2009 | Grove et al. |
| 7,636,675 B1 | 12/2009 | Cheng |
| 7,636,941 B2 | 12/2009 | Blinn et al. |
| 7,653,592 B1 | 1/2010 | Flaxman et al. |
| 7,668,840 B2 | 2/2010 | Bayliss et al. |
| 7,672,865 B2 | 3/2010 | Kumar et al. |
| 7,672,897 B2 | 3/2010 | Chung et al. |
| 7,685,021 B2 | 3/2010 | Kumar et al. |
| 7,686,214 B1 | 3/2010 | Shao et al. |
| 7,689,528 B2 | 3/2010 | Zheng |
| 7,698,236 B2 | 4/2010 | Cox et al. |
| 7,707,059 B2 | 4/2010 | Reed et al. |
| 7,711,635 B2 | 5/2010 | Steele et al. |
| 7,715,546 B2 | 5/2010 | Pagel et al. |
| 7,720,750 B2 | 5/2010 | Brody |
| 7,725,300 B2 | 5/2010 | Pinto et al. |
| 7,730,509 B2 | 6/2010 | Boulet et al. |
| 7,734,570 B2 | 6/2010 | Bachman et al. |
| 7,739,142 B2 | 6/2010 | Chand et al. |
| 7,742,982 B2 | 6/2010 | Chaudhuri et al. |
| 7,752,236 B2 | 7/2010 | Williams et al. |
| 7,783,515 B1 | 8/2010 | Kumar et al. |
| 7,783,534 B2 | 8/2010 | Armstrong et al. |
| 7,788,147 B2 | 8/2010 | Haggerty et al. |
| 7,788,358 B2 | 8/2010 | Martino |
| 7,792,702 B1 | 9/2010 | Katz et al. |
| 7,793,835 B1 | 9/2010 | Coggeshall et al. |
| 7,801,843 B2 | 9/2010 | Kumar et al. |
| 7,814,004 B2 | 10/2010 | Haggerty et al. |
| 7,835,940 B2 | 11/2010 | Kowalchuk |
| 7,853,630 B2 | 12/2010 | Martino et al. |
| 7,853,700 B2 | 12/2010 | Lee et al. |
| 7,877,320 B1 | 1/2011 | Downey |
| 7,904,524 B2 | 3/2011 | Wehner et al. |
| 7,925,549 B2 | 4/2011 | Looney et al. |
| 7,937,286 B2 | 5/2011 | Newman |
| 7,957,991 B2 | 6/2011 | Mikurak |
| 7,962,368 B2 | 6/2011 | Kumar et al. |
| 7,962,404 B1 | 6/2011 | Metzger, II et al. |
| 7,962,501 B1 | 6/2011 | Semprevivo et al. |
| RE42,663 E | 8/2011 | Lazarus et al. |
| 7,996,521 B2 | 8/2011 | Chamberlain et al. |
| 8,005,712 B2 | 8/2011 | Von Davier et al. |
| 8,005,759 B2 | 8/2011 | Hirtenstein et al. |
| 8,006,261 B1 | 8/2011 | Haberman et al. |
| 8,010,403 B2 | 8/2011 | Kala et al. |
| 8,015,045 B2 | 9/2011 | Galperin et al. |
| 8,015,140 B2 | 9/2011 | Kumar et al. |
| 8,024,264 B2 | 9/2011 | Chaudhuri et al. |
| 8,027,871 B2 | 9/2011 | Willams et al. |
| 8,027,888 B2 | 9/2011 | Chandran et al. |
| 8,032,409 B1 | 10/2011 | Mikurak |
| 8,064,586 B2 | 11/2011 | Shaffer et al. |
| 8,078,453 B2 | 12/2011 | Shaw |
| 8,078,524 B2 | 12/2011 | Crawford et al. |
| 8,086,524 B1 | 12/2011 | Craig et al. |
| 8,104,671 B2 | 1/2012 | Besecker et al. |
| 8,126,426 B2 | 2/2012 | Fridman et al. |
| 8,126,805 B2 | 2/2012 | Sulkowski et al. |
| 8,127,982 B1 | 3/2012 | Casey et al. |
| 8,135,607 B2 | 3/2012 | Willams et al. |
| 8,145,754 B2 | 3/2012 | Chamberlain et al. |
| 8,161,104 B2 | 4/2012 | Tomkow |
| 8,190,470 B2 | 5/2012 | Srivastava et al. |
| 8,200,677 B2 | 6/2012 | Martino et al. |
| 8,229,784 B2 | 7/2012 | Kala et al. |
| 8,234,498 B2 | 7/2012 | Britti et al. |
| 8,255,268 B2 | 8/2012 | Rane et al. |
| 8,271,313 B2 | 9/2012 | Williams et al. |
| 8,271,378 B2 | 9/2012 | Chaudhuri et al. |
| 8,280,805 B1 | 10/2012 | Abrahams et al. |
| 8,285,577 B1 | 10/2012 | Galperin et al. |
| 8,285,656 B1 | 10/2012 | Chang et al. |
| 8,296,229 B1 | 10/2012 | Yellin et al. |
| 8,299,784 B2 | 10/2012 | Tokutomi et al. |
| 8,301,574 B2 | 10/2012 | Kilger et al. |
| 8,346,593 B2 | 1/2013 | Fanelli |
| 8,364,588 B2 | 1/2013 | Celka et al. |
| 8,386,377 B1 | 2/2013 | Xiong et al. |
| 8,392,334 B2 | 3/2013 | Hirtenstein et al. |
| 8,412,593 B1 | 4/2013 | Song et al. |
| 8,417,559 B2 | 4/2013 | Joshi et al. |
| 8,423,634 B2 | 4/2013 | Drees et al. |
| 8,438,170 B2 | 5/2013 | Koran et al. |
| 8,458,062 B2 | 6/2013 | Dutt et al. |
| 8,468,198 B2 | 6/2013 | Tomkow |
| 8,489,619 B1 | 7/2013 | Martino et al. |
| 8,515,828 B1 | 8/2013 | Wolf et al. |
| 8,515,862 B2 | 8/2013 | Zhang et al. |
| 8,533,038 B2 | 9/2013 | Bergh et al. |
| 8,533,322 B2 | 9/2013 | Chamberlain et al. |
| 8,560,434 B2 | 10/2013 | Morris et al. |
| 8,560,666 B2 | 10/2013 | Low |
| 8,566,167 B2 | 10/2013 | Munjal |
| 8,571,919 B2 | 10/2013 | Rane et al. |
| 8,571,929 B2 | 10/2013 | Srivastava et al. |
| 8,606,626 B1 | 12/2013 | DeSoto et al. |
| 8,606,695 B1 | 12/2013 | Arora et al. |
| 8,620,740 B2 | 12/2013 | Bergh et al. |
| 8,626,563 B2 | 1/2014 | Williams et al. |
| 8,630,929 B2 | 1/2014 | Haggerty et al. |

(56)  References Cited

U.S. PATENT DOCUMENTS

| | | | |
|---|---|---|---|
| 8,639,920 | B2 | 1/2014 | Stack et al. |
| 8,688,503 | B2 | 4/2014 | Kala et al. |
| 8,694,361 | B2 | 4/2014 | Durvasula et al. |
| 8,732,004 | B1 | 5/2014 | Ramos et al. |
| 8,738,515 | B2 | 5/2014 | Chaudhuri et al. |
| 8,768,743 | B2 | 7/2014 | Kumar et al. |
| 8,805,339 | B2 | 8/2014 | Ramer et al. |
| 8,898,074 | B2 | 11/2014 | Doughty et al. |
| 8,943,060 | B2 | 1/2015 | Krishnan et al. |
| 8,966,649 | B2 | 2/2015 | Stack et al. |
| 9,058,340 | B1 | 6/2015 | Chamberlain et al. |
| 9,092,802 | B1 | 7/2015 | Akella |
| 9,105,048 | B2 | 8/2015 | Koran et al. |
| 9,152,727 | B1 | 10/2015 | Balducci et al. |
| 9,159,034 | B2 | 10/2015 | Pinckney et al. |
| 9,195,752 | B2 | 11/2015 | Amer-Yahia et al. |
| 9,213,646 | B1 | 12/2015 | LaPanse et al. |
| 9,329,715 | B2 | 5/2016 | Schwarz et al. |
| 9,471,928 | B2 | 10/2016 | Fanelli et al. |
| 9,501,781 | B2 | 11/2016 | Singh et al. |
| 9,547,870 | B1 | 1/2017 | Bradford |
| 9,595,051 | B2 | 3/2017 | Stack et al. |
| 9,704,192 | B2 | 7/2017 | Ainsworth et al. |
| 9,767,309 | B1 | 9/2017 | Patel et al. |
| 9,785,890 | B2 | 10/2017 | Sowani et al. |
| 9,846,884 | B2 | 12/2017 | Milana et al. |
| 10,019,593 | B1 | 7/2018 | Patel et al. |
| 10,026,098 | B2 | 7/2018 | Meyer et al. |
| 10,089,664 | B2 | 10/2018 | Hamdi et al. |
| 10,102,546 | B2 | 10/2018 | Heath |
| 10,169,775 | B2 | 1/2019 | Koltnow et al. |
| 10,176,498 | B2 | 1/2019 | Bhalgat |
| 10,248,968 | B2 | 4/2019 | Sivaramakrishnan et al. |
| 10,292,008 | B2 | 5/2019 | Nack et al. |
| 10,304,075 | B2 | 5/2019 | Walz et al. |
| 10,354,311 | B2 | 7/2019 | Ainsworth, III et al. |
| 10,380,619 | B2 | 8/2019 | Pontious |
| 10,380,654 | B2 | 8/2019 | Hirtenstein et al. |
| 10,423,976 | B2 | 9/2019 | Walz |
| 10,460,335 | B2 | 10/2019 | West |
| 10,467,672 | B2 | 11/2019 | Ainsworth et al. |
| 10,467,675 | B1 | 11/2019 | Manelis |
| 10,510,094 | B2 | 12/2019 | Sivaramakrishnan et al. |
| 10,621,600 | B2 | 4/2020 | Palan et al. |
| 10,657,229 | B2 | 5/2020 | Zoldi et al. |
| 10,664,759 | B2 | 5/2020 | Naik |
| 10,678,894 | B2 | 6/2020 | Yin et al. |
| 10,685,133 | B1 | 6/2020 | Patel et al. |
| 10,726,425 | B2 | 7/2020 | Korra et al. |
| 10,810,605 | B2 | 10/2020 | Fanelli et al. |
| 10,825,038 | B2 | 11/2020 | Walz et al. |
| 10,885,544 | B2 | 1/2021 | Chaouki et al. |
| 10,929,924 | B2 | 2/2021 | Koltnow et al. |
| 10,956,940 | B2 | 3/2021 | Rahman et al. |
| 11,026,042 | B2 | 6/2021 | Nack et al. |
| 11,080,722 | B2 | 8/2021 | Werner et al. |
| 11,087,339 | B2 | 8/2021 | Sowani et al. |
| 11,164,206 | B2 | 11/2021 | Andrick |
| 11,250,499 | B2 | 2/2022 | Fahner |
| 11,257,117 | B1 | 2/2022 | Tsang et al. |
| 11,443,299 | B2 | 9/2022 | Hoar |
| 11,468,472 | B2 | 10/2022 | Zoldi et al. |
| 11,468,508 | B2 | 10/2022 | Anderson et al. |
| 11,488,194 | B2 | 11/2022 | Koltnow et al. |
| 11,550,886 | B2 | 1/2023 | Yin et al. |
| 11,620,677 | B1 | 4/2023 | Tsang et al. |
| 11,657,411 | B1 | 5/2023 | Fanelli et al. |
| 11,682,041 | B1 | 6/2023 | Xu et al. |
| 11,727,425 | B2 | 8/2023 | Walz |
| 11,748,503 | B1 | 9/2023 | Patel et al. |
| 11,847,668 | B2 | 12/2023 | Andrick |
| 11,853,966 | B2 | 12/2023 | Chilaka et al. |
| 12,175,496 | B1 | 12/2024 | Xu et al. |
| 2001/0014868 | A1 | 8/2001 | Herz et al. |
| 2001/0039523 | A1 | 11/2001 | Iwamoto |
| 2002/0004754 | A1 | 1/2002 | Gardenswartz et al. |
| 2002/0023051 | A1 | 2/2002 | Kunzle et al. |
| 2002/0026356 | A1 | 2/2002 | Bergh et al. |
| 2002/0029162 | A1 | 3/2002 | Mascarenhas |
| 2002/0046089 | A1 | 4/2002 | Zorn |
| 2002/0046099 | A1 | 4/2002 | Frengut et al. |
| 2002/0046105 | A1 | 4/2002 | Gardenswartz et al. |
| 2002/0049968 | A1 | 4/2002 | Wilson et al. |
| 2002/0051020 | A1 | 5/2002 | Ferrari et al. |
| 2002/0055906 | A1 | 5/2002 | Katz et al. |
| 2002/0065716 | A1 | 5/2002 | Kuschill |
| 2002/0069203 | A1 | 6/2002 | Dar et al. |
| 2002/0077890 | A1 | 6/2002 | LaPointe et al. |
| 2002/0077964 | A1 | 6/2002 | Brody et al. |
| 2002/0082892 | A1 | 6/2002 | Raffel et al. |
| 2002/0083043 | A1 | 6/2002 | Hoshi et al. |
| 2002/0099641 | A1 | 7/2002 | Mills et al. |
| 2002/0099824 | A1 | 7/2002 | Bender et al. |
| 2002/0099936 | A1 | 7/2002 | Kou et al. |
| 2002/0116253 | A1 | 8/2002 | Coyne et al. |
| 2002/0120504 | A1 | 8/2002 | Gould et al. |
| 2002/0123904 | A1 | 9/2002 | Amengual et al. |
| 2002/0123928 | A1 | 9/2002 | Eldering et al. |
| 2002/0128960 | A1 | 9/2002 | Lambiotte et al. |
| 2002/0129368 | A1 | 9/2002 | Schlack et al. |
| 2002/0133404 | A1 | 9/2002 | Pedersen |
| 2002/0138331 | A1 | 9/2002 | Hosea et al. |
| 2002/0138333 | A1 | 9/2002 | DeCotiis et al. |
| 2002/0138334 | A1 | 9/2002 | DeCotiis et al. |
| 2002/0147669 | A1 | 10/2002 | Taylor et al. |
| 2002/0147695 | A1 | 10/2002 | Khedkar et al. |
| 2002/0161664 | A1 | 10/2002 | Shaya et al. |
| 2002/0169655 | A1 | 11/2002 | Beyer et al. |
| 2002/0194050 | A1 | 12/2002 | Nabe et al. |
| 2003/0018769 | A1 | 1/2003 | Foulger et al. |
| 2003/0023489 | A1 | 1/2003 | McGuire et al. |
| 2003/0033242 | A1 | 2/2003 | Lynch et al. |
| 2003/0033407 | A1 | 2/2003 | Low |
| 2003/0041050 | A1 | 2/2003 | Smith et al. |
| 2003/0046222 | A1 | 3/2003 | Bard et al. |
| 2003/0060284 | A1 | 3/2003 | Hamalainen et al. |
| 2003/0061233 | A1 | 3/2003 | Manasse et al. |
| 2003/0065563 | A1 | 4/2003 | Elliott et al. |
| 2003/0093311 | A1 | 5/2003 | Knowlson |
| 2003/0110293 | A1 | 6/2003 | Friedman et al. |
| 2003/0120591 | A1 | 6/2003 | Birkhead et al. |
| 2003/0144950 | A1 | 7/2003 | O'Brien et al. |
| 2003/0158776 | A1 | 8/2003 | Landesmann |
| 2003/0163708 | A1 | 8/2003 | Tang |
| 2003/0167222 | A1 | 9/2003 | Mehrotra et al. |
| 2003/0200135 | A1 | 10/2003 | Wright |
| 2003/0216965 | A1 | 11/2003 | Libman |
| 2003/0229507 | A1 | 12/2003 | Perge |
| 2003/0229892 | A1 | 12/2003 | Sardera |
| 2003/0233278 | A1 | 12/2003 | Marshall |
| 2003/0233323 | A1 | 12/2003 | Bilski et al. |
| 2003/0233655 | A1 | 12/2003 | Gutta et al. |
| 2004/0024848 | A1 | 2/2004 | Smith |
| 2004/0039688 | A1 | 2/2004 | Sulkowski et al. |
| 2004/0049729 | A1 | 3/2004 | Penfield |
| 2004/0059626 | A1 | 3/2004 | Smallwood |
| 2004/0062213 | A1 | 4/2004 | Koss |
| 2004/0078809 | A1 | 4/2004 | Drazin |
| 2004/0083215 | A1 | 4/2004 | de Jong |
| 2004/0098625 | A1 | 5/2004 | Lagadec et al. |
| 2004/0102197 | A1 | 5/2004 | Dietz |
| 2004/0107125 | A1 | 6/2004 | Guheen et al. |
| 2004/0122730 | A1 | 6/2004 | Tucciarone et al. |
| 2004/0122735 | A1 | 6/2004 | Meshkin |
| 2004/0128193 | A1 | 7/2004 | Brice et al. |
| 2004/0128236 | A1 | 7/2004 | Brown et al. |
| 2004/0138932 | A1 | 7/2004 | Johnson et al. |
| 2004/0139025 | A1 | 7/2004 | Coleman |
| 2004/0153509 | A1 | 8/2004 | Alcorn et al. |
| 2004/0163101 | A1 | 8/2004 | Swix |
| 2004/0176995 | A1 | 9/2004 | Fusz |
| 2004/0193487 | A1 | 9/2004 | Purcell et al. |
| 2004/0199456 | A1 | 10/2004 | Flint et al. |
| 2004/0199584 | A1 | 10/2004 | Kirshenbaum et al. |

(56) References Cited

U.S. PATENT DOCUMENTS

| | | |
|---|---|---|
| 2004/0199789 A1 | 10/2004 | Shaw et al. |
| 2004/0205157 A1 | 10/2004 | Bibelnieks et al. |
| 2004/0230820 A1 | 11/2004 | Hui Hsu et al. |
| 2004/0261116 A1 | 12/2004 | Mckeown et al. |
| 2005/0010494 A1 | 1/2005 | Mourad et al. |
| 2005/0021397 A1 | 1/2005 | Cui et al. |
| 2005/0050027 A1 | 3/2005 | Yeh et al. |
| 2005/0065809 A1 | 3/2005 | Henze |
| 2005/0091077 A1 | 4/2005 | Reynolds |
| 2005/0097039 A1 | 5/2005 | Kulcsar et al. |
| 2005/0102375 A1 | 5/2005 | Varghese |
| 2005/0120045 A1 | 6/2005 | Klawon |
| 2005/0120249 A1 | 6/2005 | Shuster |
| 2005/0144067 A1 | 6/2005 | Farahat et al. |
| 2005/0144641 A1 | 6/2005 | Lewis |
| 2005/0159996 A1 | 7/2005 | Lazaraus et al. |
| 2005/0177442 A1 | 8/2005 | Sullivan et al. |
| 2005/0177489 A1 | 8/2005 | Neff et al. |
| 2005/0192008 A1 | 9/2005 | Desai et al. |
| 2005/0201272 A1 | 9/2005 | Wang et al. |
| 2005/0204381 A1 | 9/2005 | Ludvig et al. |
| 2005/0209922 A1 | 9/2005 | Hofmeister |
| 2005/0222900 A1 | 10/2005 | Fuloria et al. |
| 2005/0222906 A1 | 10/2005 | Chen |
| 2005/0233742 A1 | 10/2005 | Karaoguz et al. |
| 2005/0234969 A1 | 10/2005 | Mamou et al. |
| 2005/0251820 A1 | 11/2005 | Stefanik et al. |
| 2005/0257250 A1 | 11/2005 | Mitchell et al. |
| 2005/0261959 A1 | 11/2005 | Moyer |
| 2005/0273849 A1 | 12/2005 | Araujo et al. |
| 2005/0278246 A1 | 12/2005 | Friedman et al. |
| 2005/0278743 A1 | 12/2005 | Flickinger et al. |
| 2005/0288954 A1 | 12/2005 | McCarthy et al. |
| 2006/0004626 A1 | 1/2006 | Holmen et al. |
| 2006/0004731 A1 | 1/2006 | Seibel et al. |
| 2006/0020611 A1 | 1/2006 | Gilbert et al. |
| 2006/0041443 A1 | 2/2006 | Horvath |
| 2006/0041500 A1 | 2/2006 | Diana et al. |
| 2006/0053047 A1 | 3/2006 | Garcia et al. |
| 2006/0059062 A1 | 3/2006 | Wood et al. |
| 2006/0059073 A1 | 3/2006 | Walzak |
| 2006/0080210 A1 | 4/2006 | Mourad et al. |
| 2006/0080233 A1 | 4/2006 | Mendelovich et al. |
| 2006/0080251 A1 | 4/2006 | Fried et al. |
| 2006/0080274 A1 | 4/2006 | Mourad |
| 2006/0089914 A1 | 4/2006 | Shiel et al. |
| 2006/0095363 A1 | 5/2006 | May |
| 2006/0100954 A1 | 5/2006 | Schoen |
| 2006/0122921 A1 | 6/2006 | Comerford et al. |
| 2006/0144927 A1 | 7/2006 | Love et al. |
| 2006/0155639 A1 | 7/2006 | Lynch et al. |
| 2006/0168068 A1 | 7/2006 | Ziegert |
| 2006/0173772 A1 | 8/2006 | Hayes et al. |
| 2006/0178189 A1 | 8/2006 | Walker et al. |
| 2006/0178918 A1 | 8/2006 | Mikurak |
| 2006/0178971 A1 | 8/2006 | Owen et al. |
| 2006/0178983 A1 | 8/2006 | Nice et al. |
| 2006/0195866 A1 | 8/2006 | Thukral |
| 2006/0206379 A1 | 9/2006 | Rosenberg |
| 2006/0206416 A1 | 9/2006 | Farias |
| 2006/0212350 A1 | 9/2006 | Ellis et al. |
| 2006/0212353 A1 | 9/2006 | Roslov et al. |
| 2006/0218079 A1 | 9/2006 | Goldblatt et al. |
| 2006/0224696 A1 | 10/2006 | King et al. |
| 2006/0229943 A1 | 10/2006 | Mathias et al. |
| 2006/0229996 A1 | 10/2006 | Keithley et al. |
| 2006/0230415 A1 | 10/2006 | Roeding |
| 2006/0241923 A1 | 10/2006 | Xu et al. |
| 2006/0242046 A1 | 10/2006 | Haggerty et al. |
| 2006/0242050 A1 | 10/2006 | Haggerty et al. |
| 2006/0247991 A1 | 11/2006 | Jin et al. |
| 2006/0253323 A1 | 11/2006 | Phan et al. |
| 2006/0259364 A1 | 11/2006 | Strock et al. |
| 2006/0276171 A1 | 12/2006 | Pousti |
| 2006/0277102 A1 | 12/2006 | Agliozzo |
| 2006/0282327 A1 | 12/2006 | Neal et al. |
| 2006/0282328 A1 | 12/2006 | Gerace et al. |
| 2006/0282856 A1 | 12/2006 | Errico et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0011099 A1 | 1/2007 | Sheehan |
| 2007/0016518 A1 | 1/2007 | Atkinson et al. |
| 2007/0022032 A1 | 1/2007 | Anderson et al. |
| 2007/0027791 A1 | 2/2007 | Young et al. |
| 2007/0033227 A1 | 2/2007 | Gaito et al. |
| 2007/0038516 A1 | 2/2007 | Apple et al. |
| 2007/0061190 A1 | 3/2007 | Wardell |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0067437 A1 | 3/2007 | Sindambiwe |
| 2007/0078835 A1 | 4/2007 | Donnelli |
| 2007/0121843 A1 | 5/2007 | Atazky et al. |
| 2007/0129993 A1 | 6/2007 | Alvin |
| 2007/0156515 A1 | 7/2007 | Hasselback et al. |
| 2007/0156589 A1 | 7/2007 | Zimler et al. |
| 2007/0157110 A1 | 7/2007 | Gandhi et al. |
| 2007/0169189 A1 | 7/2007 | Crespo et al. |
| 2007/0174122 A1 | 7/2007 | Howard et al. |
| 2007/0175986 A1 | 8/2007 | Petrone et al. |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0220553 A1 | 9/2007 | Branam et al. |
| 2007/0220611 A1 | 9/2007 | Socolow et al. |
| 2007/0233857 A1 | 10/2007 | Cheng et al. |
| 2007/0244732 A1 | 10/2007 | Chatterji et al. |
| 2007/0271178 A1 | 11/2007 | Davis et al. |
| 2007/0271582 A1 | 11/2007 | Ellis et al. |
| 2007/0282684 A1 | 12/2007 | Prosser et al. |
| 2007/0288271 A1 | 12/2007 | Klinkhammer |
| 2007/0288298 A1 | 12/2007 | Gutierrez et al. |
| 2007/0288359 A1 | 12/2007 | Amadio |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0294163 A1 | 12/2007 | Harmon et al. |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010142 A1 | 1/2008 | O'Brien et al. |
| 2008/0010206 A1 | 1/2008 | Coleman |
| 2008/0021802 A1 | 1/2008 | Pendleton |
| 2008/0028067 A1 | 1/2008 | Berkhin et al. |
| 2008/0040216 A1 | 2/2008 | Dellovo |
| 2008/0059317 A1 | 3/2008 | Chandran et al. |
| 2008/0059352 A1 | 3/2008 | Chandran |
| 2008/0065774 A1 | 3/2008 | Keeler |
| 2008/0086368 A1 | 4/2008 | Bauman et al. |
| 2008/0091535 A1 | 4/2008 | Heiser et al. |
| 2008/0097928 A1 | 4/2008 | Paulson |
| 2008/0109294 A1 | 5/2008 | Williams et al. |
| 2008/0109445 A1 | 5/2008 | Williams et al. |
| 2008/0120155 A1 | 5/2008 | Pliha |
| 2008/0126476 A1 | 5/2008 | Nicholas et al. |
| 2008/0133325 A1 | 6/2008 | De et al. |
| 2008/0134042 A1 | 6/2008 | Jankovich |
| 2008/0140476 A1 | 6/2008 | Anand et al. |
| 2008/0147425 A1 | 6/2008 | Durvasula |
| 2008/0167956 A1 | 7/2008 | Keithley |
| 2008/0177836 A1 | 7/2008 | Bennett |
| 2008/0183564 A1 | 7/2008 | Tien et al. |
| 2008/0184289 A1 | 7/2008 | Cristofalo et al. |
| 2008/0197189 A1 | 8/2008 | Srivastava |
| 2008/0208548 A1 | 8/2008 | Metzger et al. |
| 2008/0215470 A1 | 9/2008 | Sengupta et al. |
| 2008/0215607 A1 | 9/2008 | Kaushansky et al. |
| 2008/0222127 A1 | 9/2008 | Bergin |

(56) References Cited

U.S. PATENT DOCUMENTS

| | | |
|---|---|---|
| 2008/0228578 A1 | 9/2008 | Mashinsky |
| 2008/0228635 A1 | 9/2008 | Megdal et al. |
| 2008/0255897 A1 | 10/2008 | Megdal et al. |
| 2008/0256061 A1 | 10/2008 | Chang et al. |
| 2008/0275757 A1 | 11/2008 | Sharma et al. |
| 2008/0276271 A1 | 11/2008 | Anderson et al. |
| 2008/0294540 A1 | 11/2008 | Celka et al. |
| 2008/0294546 A1 | 11/2008 | Flannery |
| 2008/0301727 A1 | 12/2008 | Cristofalo et al. |
| 2009/0006475 A1 | 1/2009 | Udezue et al. |
| 2009/0012839 A1 | 1/2009 | Fusillo et al. |
| 2009/0018996 A1 | 1/2009 | Hunt et al. |
| 2009/0019027 A1 | 1/2009 | Ju et al. |
| 2009/0024462 A1 | 1/2009 | Lin |
| 2009/0044246 A1 | 2/2009 | Sheehan et al. |
| 2009/0064326 A1 | 3/2009 | Goldstein |
| 2009/0076883 A1 | 3/2009 | Kilger et al. |
| 2009/0089205 A1 | 4/2009 | Bayne |
| 2009/0094640 A1 | 4/2009 | Anderson et al. |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0132347 A1 | 5/2009 | Anderson et al. |
| 2009/0132559 A1 | 5/2009 | Chamberlain et al. |
| 2009/0132691 A1 | 5/2009 | Daurensan et al. |
| 2009/0133058 A1 | 5/2009 | Kouritzin et al. |
| 2009/0144102 A1 | 6/2009 | Lopez |
| 2009/0144201 A1 | 6/2009 | Gierkink et al. |
| 2009/0164293 A1 | 6/2009 | Coley |
| 2009/0171755 A1 | 7/2009 | Kane et al. |
| 2009/0172035 A1 | 7/2009 | Lessing et al. |
| 2009/0177480 A1 | 7/2009 | Chen et al. |
| 2009/0197616 A1 | 8/2009 | Lewis et al. |
| 2009/0215479 A1 | 8/2009 | Karmarkar |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234708 A1 | 9/2009 | Heiser, II et al. |
| 2009/0234715 A1 | 9/2009 | Heiser, II et al. |
| 2009/0249440 A1 | 10/2009 | Platt et al. |
| 2009/0265326 A1 | 10/2009 | Lehrman et al. |
| 2009/0288109 A1 | 11/2009 | Downey et al. |
| 2009/0313163 A1 | 12/2009 | Wang et al. |
| 2009/0319648 A1 | 12/2009 | Dutta et al. |
| 2010/0010935 A1 | 1/2010 | Shelton |
| 2010/0017300 A1 | 1/2010 | Bramlage et al. |
| 2010/0023374 A1 | 1/2010 | Berwitz et al. |
| 2010/0030649 A1 | 2/2010 | Ubelhor |
| 2010/0037255 A1 | 2/2010 | Sheehan et al. |
| 2010/0094704 A1 | 4/2010 | Subramanian et al. |
| 2010/0094758 A1 | 4/2010 | Chamberlain et al. |
| 2010/0106568 A1 | 4/2010 | Grimes |
| 2010/0114663 A1 | 5/2010 | Casas et al. |
| 2010/0125492 A1 | 5/2010 | Lin et al. |
| 2010/0138290 A1 | 6/2010 | Zschocke et al. |
| 2010/0145791 A1 | 6/2010 | Canning et al. |
| 2010/0161492 A1 | 6/2010 | Harvey et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0191598 A1 | 7/2010 | Toennis et al. |
| 2010/0211445 A1 | 8/2010 | Bodington |
| 2010/0268660 A1 | 10/2010 | Ekdahl |
| 2011/0023115 A1 | 1/2011 | Wright |
| 2011/0029388 A1 | 2/2011 | Kendall et al. |
| 2011/0047072 A1 | 2/2011 | Ciurea |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078018 A1 | 3/2011 | Chunilal |
| 2011/0078073 A1 | 3/2011 | Annappindi et al. |
| 2011/0093327 A1 | 4/2011 | Fordyce, III et al. |
| 2011/0099047 A1 | 4/2011 | Weiss |
| 2011/0106610 A1 | 5/2011 | Landis et al. |
| 2011/0125595 A1 | 5/2011 | Neal et al. |
| 2011/0137789 A1 | 6/2011 | Kortina et al. |
| 2011/0164746 A1 | 7/2011 | Nice et al. |
| 2011/0178843 A1 | 7/2011 | Rane et al. |
| 2011/0178844 A1 | 7/2011 | Rane et al. |
| 2011/0178845 A1 | 7/2011 | Rane et al. |
| 2011/0178846 A1 | 7/2011 | Rane et al. |
| 2011/0178847 A1 | 7/2011 | Rane et al. |
| 2011/0178848 A1 | 7/2011 | Rane et al. |
| 2011/0178855 A1 | 7/2011 | Rane et al. |
| 2011/0178899 A1 | 7/2011 | Huszar |
| 2011/0202407 A1 | 8/2011 | Buhrmann et al. |
| 2011/0208578 A1 | 8/2011 | Bergh et al. |
| 2011/0211445 A1 | 9/2011 | Chen |
| 2011/0212717 A1 | 9/2011 | Rhoads et al. |
| 2011/0213641 A1 | 9/2011 | Metzger, II et al. |
| 2011/0219421 A1 | 9/2011 | Ullman et al. |
| 2011/0258050 A1 | 10/2011 | Chan et al. |
| 2011/0264581 A1 | 10/2011 | Clyne |
| 2011/0270618 A1 | 11/2011 | Banerjee et al. |
| 2011/0270661 A1 | 11/2011 | Heiser, II et al. |
| 2011/0276396 A1 | 11/2011 | Rathod |
| 2011/0282739 A1 | 11/2011 | Mashinsky et al. |
| 2011/0307397 A1 | 12/2011 | Benmbarek |
| 2011/0314048 A1 | 12/2011 | Ickman et al. |
| 2012/0011056 A1 | 1/2012 | Ward et al. |
| 2012/0011068 A1 | 1/2012 | Dearing et al. |
| 2012/0011158 A1 | 1/2012 | Avner et al. |
| 2012/0016717 A1 | 1/2012 | Williams et al. |
| 2012/0016733 A1 | 1/2012 | Belvin et al. |
| 2012/0016948 A1 | 1/2012 | Sinha |
| 2012/0047219 A1 | 2/2012 | Feng et al. |
| 2012/0054592 A1 | 3/2012 | Jaffe et al. |
| 2012/0059713 A1 | 3/2012 | Galas et al. |
| 2012/0060207 A1 | 3/2012 | Mardikar et al. |
| 2012/0066065 A1 | 3/2012 | Switzer |
| 2012/0101892 A1 | 4/2012 | LeFebvre |
| 2012/0110677 A1 | 5/2012 | Abendroth et al. |
| 2012/0143921 A1 | 6/2012 | Wilson |
| 2012/0173336 A1 | 7/2012 | Strumolo |
| 2012/0179536 A1 | 7/2012 | Kalb et al. |
| 2012/0203639 A1 | 8/2012 | Webster et al. |
| 2012/0209586 A1 | 8/2012 | Mieritz et al. |
| 2012/0239497 A1 | 9/2012 | Nuzzi |
| 2012/0239515 A1 | 9/2012 | Batra et al. |
| 2013/0066676 A1 | 3/2013 | Williams et al. |
| 2013/0080242 A1 | 3/2013 | Alhadeff et al. |
| 2013/0080467 A1 | 3/2013 | Carson et al. |
| 2013/0085804 A1 | 4/2013 | Leff et al. |
| 2013/0117832 A1 | 5/2013 | Gandhi |
| 2013/0132151 A1 | 5/2013 | Stibel et al. |
| 2013/0218638 A1 | 8/2013 | Kilger et al. |
| 2013/0226857 A1 | 8/2013 | Shim et al. |
| 2013/0252638 A1 | 9/2013 | Yang et al. |
| 2013/0262226 A1 | 10/2013 | LaChapelle et al. |
| 2013/0293363 A1 | 11/2013 | Plymouth |
| 2013/0332230 A1 | 12/2013 | Fanelli et al. |
| 2013/0339065 A1 | 12/2013 | Denning et al. |
| 2013/0339087 A1 | 12/2013 | Fanelli et al. |
| 2013/0339093 A1 | 12/2013 | Fanelli et al. |
| 2013/0339143 A1 | 12/2013 | Drozd et al. |
| 2014/0025489 A1 | 1/2014 | Srivastava et al. |
| 2014/0025815 A1 | 1/2014 | Low |
| 2014/0032265 A1 | 1/2014 | Paprocki et al. |
| 2014/0046887 A1 | 2/2014 | Lessin |
| 2014/0058818 A1 | 2/2014 | Drozd et al. |
| 2014/0096249 A1 | 4/2014 | Dupont et al. |
| 2014/0164112 A1 | 6/2014 | Kala |
| 2014/0164398 A1 | 6/2014 | Smith et al. |
| 2014/0172576 A1 | 6/2014 | Spears et al. |
| 2014/0188555 A1 | 7/2014 | Durvasula |
| 2014/0207582 A1 | 7/2014 | Flinn et al. |
| 2014/0214482 A1 | 7/2014 | Williams et al. |
| 2014/0222908 A1 | 8/2014 | Park et al. |
| 2014/0236706 A1 | 8/2014 | Opie et al. |
| 2014/0278507 A1 | 9/2014 | Potter |
| 2014/0279420 A1 | 9/2014 | Okerlund et al. |
| 2014/0310098 A1 | 10/2014 | Epperson |
| 2014/0324447 A1 | 10/2014 | Dittus |
| 2014/0330670 A1 | 11/2014 | Ainsworth, III et al. |

(56) References Cited

U.S. PATENT DOCUMENTS

| | | |
|---|---|---|
| 2014/0337128 A1 | 11/2014 | Carobus et al. |
| 2014/0351044 A1 | 11/2014 | Rahman |
| 2015/0019317 A1 | 1/2015 | Mitchell |
| 2015/0019394 A1 | 1/2015 | Unser et al. |
| 2015/0058957 A1 | 2/2015 | Halliday et al. |
| 2015/0095104 A1 | 4/2015 | Goldberg |
| 2015/0106270 A1 | 4/2015 | Burrell et al. |
| 2015/0128240 A1 | 5/2015 | Richards et al. |
| 2015/0128287 A1 | 5/2015 | LaFever |
| 2015/0193821 A1 | 7/2015 | Izumori et al. |
| 2015/0248691 A1 | 9/2015 | Pontious |
| 2015/0262248 A1 | 9/2015 | Chaouki et al. |
| 2015/0278225 A1 | 10/2015 | Weiss et al. |
| 2015/0295906 A1 | 10/2015 | Ufford et al. |
| 2015/0332391 A1 | 11/2015 | Srivastava et al. |
| 2015/0348119 A1 | 12/2015 | Ferber |
| 2015/0348166 A1 | 12/2015 | Trivedi |
| 2015/0348200 A1 | 12/2015 | Fair et al. |
| 2015/0379576 A1 | 12/2015 | Otis et al. |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2016/0098748 A1 | 4/2016 | Dittus |
| 2016/0162913 A1 | 6/2016 | Linden et al. |
| 2016/0189192 A1 | 6/2016 | Walz |
| 2016/0267508 A1 | 9/2016 | West |
| 2016/0321437 A1 | 11/2016 | Kimmell |
| 2016/0371740 A1 | 12/2016 | Heiser, II et al. |
| 2017/0032393 A1 | 2/2017 | Fanelli et al. |
| 2017/0186297 A1 | 6/2017 | Brenner |
| 2017/0193315 A1 | 7/2017 | El-Khamy et al. |
| 2017/0302627 A1 | 10/2017 | Lai et al. |
| 2018/0060954 A1 | 3/2018 | Yin |
| 2018/0068323 A1 | 3/2018 | Stratton et al. |
| 2018/0121940 A1 | 5/2018 | Fanelli et al. |
| 2018/0276710 A1 | 9/2018 | Tietzen et al. |
| 2019/0087848 A1 | 3/2019 | Koltnow et al. |
| 2019/0147519 A1 | 5/2019 | Ainsworth, III et al. |
| 2019/0164184 A1 | 5/2019 | Walz |
| 2019/0180327 A1 | 6/2019 | Balagopalan et al. |
| 2019/0230464 A1 | 7/2019 | Nack et al. |
| 2019/0244237 A1 | 8/2019 | Magnuson, Jr. et al. |
| 2020/0043103 A1 | 2/2020 | Sheptunov |
| 2020/0126040 A1 | 4/2020 | Chilaka et al. |
| 2020/0286168 A1 | 9/2020 | Anderson et al. |
| 2020/0294127 A1 | 9/2020 | Anderson et al. |
| 2020/0334695 A1 | 10/2020 | Schmidt |
| 2020/0334702 A1 | 10/2020 | Butvin et al. |
| 2020/0349240 A1 | 11/2020 | Yin et al. |
| 2021/0019742 A1 | 1/2021 | Pontious et al. |
| 2021/0065161 A1 | 3/2021 | Hoar |
| 2021/0142372 A1 | 5/2021 | Sadhwani et al. |
| 2021/0406948 A1 | 12/2021 | Chaouki et al. |
| 2022/0027934 A1 | 1/2022 | Andrick |
| 2022/0182352 A1 | 6/2022 | Torrey et al. |
| 2022/0198555 A1 | 6/2022 | Fahner |
| 2022/0366398 A1 | 11/2022 | Butvin et al. |
| 2022/0414769 A1 | 12/2022 | Anderson et al. |
| 2023/0230120 A1 | 7/2023 | Koltnow et al. |
| 2024/0111886 A1 | 4/2024 | Patel et al. |

FOREIGN PATENT DOCUMENTS

| | | |
|---|---|---|
| CN | 1290372 | 5/2001 |
| CN | 114004655 | 2/2022 |
| DE | 91 08 341 | 10/1991 |
| EP | 0 554 083 | 8/1993 |
| EP | 0 749 081 | 12/1996 |
| EP | 1 028 401 | 8/2000 |
| EP | 1 122 664 | 8/2001 |
| JP | 10-293732 | 11/1998 |
| JP | 11-068828 | 3/1999 |
| JP | 2009-122880 | 6/2009 |
| JP | 2015-503148 | 1/2015 |
| KR | 10-2013-0107394 | 10/2013 |
| TW | 1256569 | 6/2006 |
| WO | WO 91/003789 | 3/1991 |
| WO | WO 94/006103 | 3/1994 |
| WO | WO 95/016971 | 6/1995 |
| WO | WO 96/042041 | 12/1996 |
| WO | WO 97/023838 | 7/1997 |
| WO | WO 98/041913 | 9/1998 |
| WO | WO 98/049643 | 11/1998 |
| WO | WO 98/057285 | 12/1998 |
| WO | WO 99/004350 | 1/1999 |
| WO | WO 99/022328 | 5/1999 |
| WO | WO 99/032985 | 7/1999 |
| WO | WO 99/033012 | 7/1999 |
| WO | WO 99/037066 | 7/1999 |
| WO | WO 99/059375 | 11/1999 |
| WO | WO 99/067731 | 12/1999 |
| WO | WO 00/055789 | 9/2000 |
| WO | WO 00/055790 | 9/2000 |
| WO | WO 00/068862 | 11/2000 |
| WO | WO 01/010090 | 2/2001 |
| WO | WO 01/011522 | 2/2001 |
| WO | WO 01/075754 | 10/2001 |
| WO | WO 02/013025 | 2/2002 |
| WO | WO 03/101123 | 12/2003 |
| WO | WO 2006/110873 | 10/2006 |
| WO | WO 2007/149941 | 12/2007 |
| WO | WO 2008/022289 | 2/2008 |
| WO | WO 2008/057853 | 5/2008 |
| WO | WO 2008/076343 | 6/2008 |
| WO | WO 2008/127288 | 10/2008 |
| WO | WO 2009/132114 | 10/2009 |
| WO | WO 2010/045160 | 4/2010 |
| WO | WO 2010/062537 | 6/2010 |
| WO | WO 2010/093678 | 8/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |
| WO | WO 2015/066304 | 5/2015 |
| WO | WO 2018/039377 | 3/2018 |
| ZA | 2009/03243 | 3/2010 |

OTHER PUBLICATIONS

U.S. Appl. No. 12/705,511, filed Feb. 12, 2010, Bargoli et al.

"8 Audience Targeting Strategies from Digital Marketing Experts", Apr. 15, 2019, https://www.wordstream.com/blog/ws/2019/04/15/audience-targeting, pp. 13.

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May 22/ai_n16374159.

"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=428.

"Aggregate and Analyze Social Media Content: Gain Faster and Broader Insight to Market Sentiment," SAP Partner, Mantis Technology Group, Apr. 2011, pp. 4.

Akl, Selim G., "Digital Signatures: A Tutorial Survey," Computer, Feb. 1983, pp. 15-24.

"Atlas On Demand, Concurrent, and Everstream Strike Video-On-Demand Advertising Alliance", www.atlassolutions.com, Jul. 13, 2006, 3 pages.

"Arbitron 2006 Black Consumers," Arbitron Inc., lvtsg.com, Jul. 8, 2006, 2 pages, http://www.lvtsg.com/news/publish/Factoids/article_3648.shtml.

"Atlas On Demand and C-COR Join Forces to Offer Advertising Management Solution for On Demand TV: Global Provider of On Demand Systems Partners with Atlas to Develop and Market Comprehensive VOD Advertising Solution," www.atlassolutions.com, Jul. 25, 2005, 3 pages.

"Atlas On Demand and Tandberg Television Join Forces to Enhance Dynamic Ad Placement for On-Demand Television: Combined End-to End Solution to Provide Media Buying and Selling Com-

(56) References Cited

OTHER PUBLICATIONS munities with New Tools for Dynamic Advertising that Eliminate Technical Bar" Jun. 22, 2006—3 pages, http://www.atlassolutions.com/news_20060622.aspx.

Adzilla, Press Release, "ZILLACASTING Technology Approved and Patent Pending," http://www.adzilla.com/newsroom/pdf/patent_051605.pdf, May 16, 2005, pp. 2.

AFX New Limited—AFX International Focus, "Nielsen moving to measure off-TV viewing," Jun. 14, 2006, 1 page.

Amo, Tina, "How to Find Out Who Has Lived inYour House Before You", https://web.archive.org/web/20130327090532/http://homeguides.sfgate.com/out-lived-house-before-50576.html as archived Mar. 27, 2013, pp. 2.

Applied Geographic Solutions, "What is MOSAIC™", as captured Feb. 15, 2004 from http://web.archive.org/web/20040215224329/http://www.appliedgeographic.com/mosaic.html in 2 pages.

Axiom, "Capabilites", http://www.axiomcom.com/capabilities/, printed May 7, 2015 in 2 pages.

Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.

Bagozzi et al., "On the Evaluation of Structural Equation Models", JAMS, 1988, pp. 74-94.

"Bank of America Direct Web-Based Network Adds Core Functionality to Meet Day-to-Day Treasury Needs", Business Wire, Oct. 25, 1999. pp. 2.

"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.

Bhatnagar et al., "Identifying Locations for Targeted Advertising on the Internet", International Journal of Electronic Commerce, Spring 2001, vol. 5, No. 3, pp. 23-44.

Bitran et al., "Mailing Decisions in Catalog Sales Industry", Management Science (JSTOR), vol. 42, No. 9, pp. 1364-1381, Sep. 1996.

Blackbaud.com, www.blackbaud.com, various pages, retrieved Jan. 22, 2009 from www.archive.org, 23 pages.

Boerman et al., "Online Behavioral Advertising: A Literature Review and Research Agenda", Journal of Advertising, 2017, vol. 46, No. 3, pp. 363-376.

Brown et al., "ALCOD IDSS: Assisting the Australian Stock Market Surveillance Team's Review Process," Applied Artificial Intelligence Journal, Dec. 1, 1996, pp. 625-641.

Bult et al., "Optimal Selection for Direct Mail," Marketing Science, Nov. 1995, vol. 14, No. 4, pp. 378-394.

Burr Ph.D., et al., "Utility Payments as Alternative Credit Data: A Reality Check", Asset Builders of America, Inc., Oct. 5, 2006, pp. 1-18, Washington, D.C.

"Cable Solution Now, The Industry Standard for Information Management: Strata's TIM.net Crosses Important Threshold Dominant Solution for All Top 20 TV Markets," stratag.com, Apr. 28, 2006, 1 page, http://stratag.com/news/cablepress042806.html.

Caliendo, et al., "Some Practical Guidance for the Implementation of Propensity Score Matching", IZA:Discussion Paper Series, No. 1588, Germany, May 2005, pp. 32.

Card Marketing, Use the Latest CRM Tools and Techniques, www.CardForum.com, vol. 5 No. 10, Dec. 2001.

"Case Study: Expanding to Non-Traditional Prescreen Marketing Channels Reduces Company's Cost Per Account Booked", FairIsaac, https://web.archive.org/web/20060428115326/http://www.fairisaac.com/NR/rdonlyres/048FAE87-14B5-4732-970D-BDF20F09EB2D/0/MSDSRealTimeCS.pdf, Apr. 2003, pp. 2.

ChannelWave.com, PRM Central—About PRM, http://web.archive.org/web/20000510214859/http://www.channelwave.com as printed on Jun. 21, 2006, May 2000 Archive.

"Chase Gets Positive," Bank Technology News, May 6, 2000, vol. 14, No. 5, p. 33.

Chung, Charles; Internet Retailer, "Multi-channel retailing requires the cleanest data—but don't expect it from the customer", Jan./Feb. 2002.

"Claritas Forms Life Insurance Consortium with Worldwide Financial Services Association: Initiative with LIMRA International is First of its Kind to Provide Actual Sales Information at Small Geographic Areas," Feb. 9, 2006, 3 pages, http://www.claritas.com/claritas/Default/jsp?ci=5&si=1&pn=limra.

"Claritas Introduces PRIZM NE Consumer Electronic Monitor Profiles: New Information Product Provides Insight Into the Public's Purchasing Behaviors of Consumer Electronics," May 30, 2006, 3 pages.

"Cole Taylor Bank Chooses Integrated E-Banking/E-Payments/Reconciliation Solution From Fundtech", Business Wire, Oct. 21, 1999, pp. 2.

Click Z, "ISPs Collect User Data for Behavioral Ad Targeting," dated Jan. 3, 2008, printed from http://www.clickz.com/showPage.html?page=clickz Apr. 16, 2008.

CNET news.com, "Target me with your ads, please," dated Dec. 5, 2007, printed from http://www.news.com/2102-1024_3-6221241.html?tag+st.util.print Mar. 18, 2008.

Creamer, Matthew; Consulting in marketing; Accenture, Others Playing Role in Firms' Processes, Crain's Chicago Business, Jun. 12, 2006, 2 pages.

Culhane, Patrick, "Data: Powerfully Linking Service and Profitability," Jul./Aug. 1996, Bank Management, vol. 72, No. 4, pp. 8-12.

CuneXus, "CuneXus Unveils Click-to-Accept Mobile Lending Platform at Finovate (Video)", https://cunexusonline.com/cunexus-finovatespring-video-released/, May 2, 2014, pp. 2.

"Database Marketing: A new Approach to the Old Relationships," Chain Storage Executive Edition, Dialogue, Sep. 1991, pp. 2.

Davies, Donald W., "Applying the RSA Digital Signature to Electronic Mail," Computer, Feb. 1983, pp. 55-62.

Davis et al., "User Acceptance of Computer Technology: A Comparison of Two Theoretical Models", Management Science, Aug. 1989, vol. 35, No. 8, pp. 982-1003.

DeGruchy, et al., "Geodemographic Profiling Benefits Stop-Smoking Service;" The British Journal of Healthcare Computing & Information Management; Feb. 2007; 24, 7; pp. 29-31.

Delany et al., "Firm Mines Offline Data to Target Online", http://web.archive.org/web/20071117140456/http://www.commercialalert.org/news/archive/2007/10/firm-mines-offline-data-to-target-online-ads, Commercial Alert, Oct. 17, 2007, pp. 3.

demographicsnow.com, sample reports, "Age Rank Report", Jul. 17, 2006, 3 pages.

demographicsnow.com, sample reports, "Consumer Expenditure Summary Report", Jul. 17, 2006, 3 pages.

demographicsnow.com, sample reports, "Income Comparison Report", Jul. 17, 2006, 4 pages.

Deshpande et al., "Web Based Targeted Advertising: A Study Based on Patent Information", ScienceDirect, Procedia Economics and Finance, 2014, pp. 522-535.

Dolnicar, Sara, "Using Cluster Analysis for Market Segmentation—Typical Misconceptions, Established Methodological Weaknesses and Some Recommendations for Improvement," Australasian Journal of Market Research, 2003, vol. 11, No. 2, pp. 5-12.

Downey, Sarah A., "Smile, you're on Spokeo.com! Concerned? (here's what to do)", https://www.abine.com/blog/2011/how-to-remove-yourself-from-spokeo/, as posted Jan. 13, 2011 in 7 pages.

Drawbridge, "Customer Success", http://www.drawbrid.ge/customer-success, printed May 7, 2015 in 17 pages.

Drawbridge, "Solutions", http://www.drawbridge/solutions, printed May 7, 2015 in 5 pages.

Drawbridge, "Technology", http://www.drawbridge/technology, printed May 7, 2015 in 3 pages.

Dstillery, "Products", http://dstillery.com/how-we-do-it/products/, printed May 7, 2015 in 2 pages.

Dstillery, "What We Do", http://dstillery.com/what-we-do/, printed May 7, 2015 in 2 pages.

Dstillery, "Who We Are", http://dstillery.com/who-we-are/, printed May 7, 2015 in 2 pages.

(56) References Cited

OTHER PUBLICATIONS

Dwyer, Catherine, "Behavioral Targeting: A Case Study of Consumer Tracking on Levis.com", Proceedings of the Fifteenth Americas Conference on Information Systems, San Francisco, CA, Aug. 6-9, 2009, pp. 1-10.
Dymi, Amilda, Need for Leads Spurs Some Upgrades, Origination News—Special Report, May 1, 2008, vol. vol. 17, Issue No. 8, Pages p. 24, Atlanta, Copyright 2008 SourceMedia, Inc.
"EDAA Privacy Certification", https://trustarc.com/truste-certifications/edaa-certification/, as printed Dec. 22, 2022 in 5 pages.
Egol, Len; "What's New in Database Marketing Software," Direct, Aug. 1994, vol. 6, No. 8, pp. 39.
"Epsilon Leads Discussion on Paradigm Shift in TV Advertising," epsilon.com, Jun. 24, 2004, 2 pages, http://www.epsilon.com/who-pr_tvad040624.html.
Experian and AGS Select SRC to Deliver Complete Marketing Solutions; Partnership First to Marketplace with Census2000 Data. PR Newswire. New York: Mar. 21, 2001. p. 1.
"Experian Launches Portfolio Monitor—Owner NoticesSM", News Release, Feb. 2003, Costa Mesa, CA.
Fanelli, Marc, "Building a Holistic Customer View", MultiChannel Merchant, Jun. 26, 2006, pp. 2.
Findermind, "PeopleFinders Review", as archived Jun. 1, 2012 in 4 pages. http://web.archive.org/web/20120601010134/http://www.findermind.com/tag/peoplefinders-review/.
Frontporch, "Ad Networks-Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
"FTC Testifies: Identity Theft on the Rise", FTC News Release, Mar. 7, 2000, pp. 3.
Gandolf, Stewart, "Top 15 Healthcare Marketing Trends for 2020", https://healthcaresuccess.com/blog/healthcare-marketing/healthcare-marketing-2019.html, Dec. 20, 2018, pp. 8.
Georges, et al., "KDD'99 Competition: Knowledge Discovery Contest", SAS Institute, 1999, 6 pages.
Gilje, Shelby, "Keeping Tabs on Businesses That Keep Tabs on US", NewsRoom, The Seattle Times, Section: Scene, Apr. 19, 1995, pp. 4.
Gonul, et al., "Optimal Mailing of Catalogs: A New Methodology Using Estimable Structural Dynamic Programming Models", 14 pages, Management Science, vol. 44, No. 9, Sep. 1998.
"Google Ads Now Tracks Store Visits", Conversion Logix, <https://conversionlogix.com/blog/2019/03/13/google-ads-now-tracks-store-visits/>, dated Mar. 13, 2019 in 4 pages.
Greitsch, Philipp, "Beginner's Guide to Location-Based Mobile Advertising", https://trendblog.net/beginners-guide-location-based-mobile-advertising/, Mar. 8, 2013, pp. 4.
Halliday, Jean, "Ford Recruits Accenture for Marketing Plan," Automotive News Feb. 13, 2006, 2 pages, Crain Communications.
Hartfeil, Guenther, "Bank One Measures Profitability of Customers, Not Just Products," Journal of Retail Banking Services, Aug. 1996, vol. 18, No. 2, pp. 23-29.
Haughton et al., "Direct Marketing Modeling with CART and CHAID", Journal of Direct Marketing, Fall 1997, vol. 11, No. 4, pp. 42-52.
Helm, Burt, "Nielsen's New Ratings Yardstick," businessweek.com, Jun. 20, 2006, 3 pages, http://www.businessweek.com/technology/content/jun2006/tc20060620_054223.htm.
Hill, Kerry, "Identity Theft Your Social Security Number Provides Avenue for Thieves", NewsRoom, Wisconsin State Journal, Sep. 13, 1998, pp. 4.
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.
Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/page/news/pr/pr_archive?mode=single&pr_id=117, printed Oct. 4, 2007 in 2 pages.
"Intelligent Miner Applications Guide", IBM Corp., Apr. 2, 1999, Chapters 4-7, pp. 33-132.
"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.
Jost, Allen; Neural Networks, Credit World, Mar./Apr. 1993, vol. 81, No. 4, pp. 26-33.
Karlan et al., "Observing Unobservables: Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Lamons, Bob, "Be Smart: Offer Inquiry Qualification Services," Marketing News, ABI/Inform Global, Nov. 6, 1995, vol. 29, No. 23, pp. 13.
LeadVerifier: Why Should You Use LeadVerifier?, downloaded from www.leadverifier.com/LeadVerifier_Why.asp, dated Feb. 7, 2006 on www.archive.org.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
LifeLock, http://web.archive.org/web/20110724011010/http://www.lifelock.com/? as archived Jul. 24, 2011 in 1 page.
Littwin, Angela, "Beyond Usury: A Study of Credit-Card Use and Preference Among Low-Income Consumers", Texas Law Review, vol. 86, No. 3, pp. 451-506; Feb. 2008.
Longo, Tracey, "Managing Money: Your Family Finances", Kiplinger's Personal Finance Magazine, Jun. 1, 1995, vol. 49, No. 6, pp. 4.
Loshin, Intelligent Enterprise: Better Insight for Business Decisions, "Value-Added Data: Merge Ahead", Feb. 9, 2000, vol. 3, No. 3, 5 pages.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.
Morrissey, Brian, "Aim High: Ad Targeting Moves to the Next Level", ADWEEK, dated Jan. 21, 2008 as downloaded from http://www.adweek.com/aw/magazine/article_display.isp?vnu on Apr. 16, 2008.
Muus, et al., "A Decision Theoretic Framework for Profit Maximization in Direct Marketing", Sep. 1996, pp. 20.
NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.
"New Privista Product Provides Early Warning System to Combat Identity Theft", PR Newswire, Oct. 24, 2000, PR Newswire Association, Inc., New York.
Otter, et al., "Direct Mail Selection by Joint Modeling of the Probability and Quantity of Response", Jun. 1997, pp. 14.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
"PostX to Present at Internet Showcase", PR Newswire, Apr. 28, 1997, pp. 2.
PostX, "PostX® Envelope and ActiveView", http://web.archive.org/web/19970714203719/http://www.postx.com/products_fm.html, Jul. 14, 1997 (retrieved Nov. 7, 2013) in 2 pages.

(56)                    References Cited

OTHER PUBLICATIONS

PR Web: Press Release Newswire, Anchor Launches LeadVerifier to Verify, Correct and Enhance Internet Leads, Jul. 19, 2005, pp. 2 pages, Farmingdale, NY.

Predictive Behavioral Targeting http://www.predictive-behavioral-targeting.com/index.php.Main_Page as printed Mar. 28, 2008 in 4 pages.

PrivacyGuard, http:/web.archive.org/web/20110728114049/http://www.privacyguard.com/ as archived Jul. 28, 2011 in 1 page.

Punj et al., "Cluster Analysis in Marketing Research: Review and Suggestions for Application," Journal of Marketing Research, May 1983, vol. 20, No. 2, pp. 134-148.

Reinbach, Andrew, "MCIF Aids Banks in CRA Compliance", Bank Systems & Technology, Aug. 1995, vol. 32, No. 8, p. 27.

Rossi et al.; "The Value of Purchasing History Data in Target Marketing"; Marketing Science, Apr. 1996, vol. 15, No. 4, pp. 321-340.

Schmittlein et al., "Customer Base Analysis: An Industrial Purchase Process Application", Marketing Science, vol. 13, No. 1, Winter 1994, pp. 41-67.

Smith, Richard M., "The Web Bug FAQ", Nov. 11, 1999, Version 1.0, pp. 4.

"SRC Announces Free Dashups to Mashups Adding Geographic Business Intelligence at Web Speed to the Enterprise on www. FreeDemographics.com/API," directionsmag.com, Jun. 12, 2006, 3 pages, http://www.directionsmag.com/press.releases/index.php?duty=Show&id=1.

"SRC Delivers Industry's First Drive Time Engine Developed to Follow Actual Road Networks," thomasnet.com, May 21, 2006, 4 pages, http://news.thomasnet.com/companystory/485722.

Stein, Benchmarking Default Prediction Models: Pitfalls and Remedies in Model Validation, Moody's KMV, Revised Jun. 13, 2002, Technical Report #020305; New York.

Sweat, Jeff; "Know Your Customers," Information Week, Nov. 30, 1998, pp. 20.

Tao, Lixin, "Shifting Paradigms with the Application Service Provider Model"; Concordia University, IEEE, Oct. 2001, Canada.

TARGUSinfo: Lead Verification, Verify Your Leads With Unique Accuracy and Ease, downloaded from www.targusinfo.com/solutions/verify/Default.asp, as printed Aug. 1, 2006.

TARGUSinfo: Solutions: Services: Verify Express—Verify, Correct and Enhance Customer Provided Data, downloaded from http://web.archive.org/web/20051028122545/http://www.targusinfo.com/solutions/services/verify/, Oct. 28, 2005, as printed Apr. 30, 2011, 27 pgs.

Thoemmes, Felix, "Propensity Score Matching in SPSS", Center for Educational Science and Psychology, University of Tübingen, Jan. 2012.

TransUnion, "DecisionEdge | MobileCredit", https://www.transunion.co.za/resources/transunion-za/doc/product/resources/product-decisionedge-acquisition-mobilecredit-as.pdf, 2015, pp. 2.

UPI, "Nielsen Media Research goes electronic," Jun. 14, 2006, 1 page.

"VOD Integration Now Available In Strata: Buyers / Sellers Benefit from VOD Component on Popular Platform," stratag.com, Feb. 21, 2006, 1 page, http://www.stratag.com/news/mediapress022106.html.

Warshaw, Paul R., "A New Model for Predicting Behavioral Intentions: An Alternative to Fishbein", Journal of Marketing Research, May 1980, vol. XVII, pp. 153-172.

Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.

"What is Behavioral Targeting?", Lotame, https://www.lotame.com/what-is-behavioral-targeting/, Sep. 17, 2018, pp. 11.

White, Ron, "How Computers Work", Millennium Edition, Que Corporation, Indianapolis, IN, Sep. 1999, pp. 284.

Whitney, Daisy; Atlas Positioning to Shoulder VOD Ads; Campaign Management Tools Optimize Inventory, TelevisionWeek, May 23, 2005, 3 pages.

Wyner, "Customer valuation: Linking behavior and economics", Aug. 1996, Marketing Research: A Magazine of Management & Applications vol. 8, No. 2 pp. 36-38.

Yan et al., "How Much Can Behavioral Targeting Help Online Advertising?", WWW 2009, Apr. 20-24, 2009, Madrid, Spain, pp. 261-270.

Yoon, Chang Woo; "Vicarious Certification and Billing Agent for Web Information Service", High Spped Network Access Section, Electronics and Telecommunications Research Institute, Jan. 21-23, 1998, pp. 344-349.

Yun et al., "An Efficient Clustering Algorithm for Market Basket Data Based on Small Large Ratios," Computer Software and Applications Conference, Oct. 2001, pp. 505-510.

Zen et al., "Value-Added Internet: a Pragmatic TINA-Based Path to the Internet and PSTN Integration", Global Convergence of Telecommunications and Distribute Object Computing, Nov. 17-20, 1997, pp. 10.

Declaration of Paul Clark, DSc. for Inter Partes Review of U.S. Pat. No. 8,504,628 (Symantec Corporation, Petitioner), dated Jan. 15, 2014 in 76 pages.

Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.) Filed Jan. 14, 2014 in 9 pages.

First Amended Complaint in Civil Action No. 2:12-cv-511-JRG (*Rpost Holdings, Inc. and Rpost Communications Limited* V. *Constant Contact, Inc.*; et al.) filed Feb. 11, 2013 in 14 pages.

First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.

First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.

Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.

Source Code Appendix attached to U.S. Appl. No. 08/845,722 by Venkatraman et al., Exhibit A, Part 1 & 2, pp. 32.

Official Communication in Canadian Patent Application No. 2,381,349, dated May 17, 2013.

Official Communication in Canadian Patent Application No. 2,381,349, dated Jul. 31, 2014.

International Preliminary Examination Report in International Application No. PCT/US00/21453 dated, Jun. 26, 2001.

International Search Report and Written Opinion for Application No. PCT/US2007/021815, dated Sep. 5, 2008.

International Search Report and Written Opinion for Application No. PCT/US2008/064594, dated Oct. 30, 2008.

International Preliminary Report and Written Opinion in PCT/US2008/064594, mailed Dec. 10, 2009.

International Search Report and Written Opinion for Application No. PCT/US2008/083939, dated Jan. 29, 2009.

International Search Report and Written Opinion for Application No. PCT/US09/60393, dated Dec. 23, 2009.

International Search Report and Written Opinion for Application No. PCT/US2010/034434, dated Jun. 23, 2010.

International Preliminary Report on Patentability for Application No. PCT/US2010/034434, dated Feb. 4, 2014.

International Search Report and Written Opinion for Application No. PCT/US2013/052342, dated Nov. 21, 2013.

International Preliminary Report on Patentability for Application No. PCT/US2013/052342, dated Feb. 5, 2015.

International Search Report and Written Opinion for Application No. PCT/US2017/048265, dated Dec. 5, 2017.

International Preliminary Report on Patentability in Application No. PCT/US2017/048265, dated Mar. 7, 2019.

SYSTEMS AND METHODS OF A TRACKING ANALYTICS PLATFORM

CROSS-REFERENCE TO RELATED APPLICATIONS

This application is a continuation of U.S. patent application Ser. No. 18/142,953, filed May 3, 2023, entitled SYSTEMS AND METHODS OF A TRACKING ANALYTICS PLATFORM, which is a continuation of U.S. Patent Application No. 17/144,023, filed Jan. 7, 2021, entitled SYSTEMS AND METHODS OF A TRACKING ANALYTICS PLATFORM, which claims the benefit of priority to U.S. Patent Application No. 62/960,649, filed Jan. 13, 2020, entitled SYSTEMS AND METHODS OF A TRACKING ANALYTICS PLATFORM, all of which are hereby incorporated by reference herein in their entirety (including all figures and appendices therein).

BACKGROUND

The present disclosure relates generally to systems and methods for analyzing consumer data to generate custom information for presenting information to the consumer. More specifically, modern computing and corresponding technologies have facilitated the development of systems for capturing and analyzing user data across various platforms and media. This analyzed data can be used to provide messages to the users. Thus, capture and analysis of the user data can be helpful to various businesses and industries.

SUMMARY OF EMBODIMENTS

In one aspect, an analytics tracking system is disclosed. The system comprises an interface in electronic communication with one or more consumer devices configured to enable a corresponding consumer to access the interface via a mobile application. The system further comprises a consumer data store comprising data regarding at least one consumer, a movement data store comprising data regarding locations and/or movement of the at least one consumer, and an online behavior data (OBD) data store comprising data associated with browsing and/or application data histories of the at least one consumer. The system also comprises a dynamic analysis system configured to analyze data from the consumer data store, the movement data store, and the OBD data store to generate at least one of custom information for the at least one consumer or identify a location for presentation of information to the at least one consumer.

BRIEF DESCRIPTION OF THE DRAWINGS

Embodiments of the above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale. The following drawings and the associated descriptions are provided to illustrate embodiments of the present disclosure and do not limit the scope of the claims.

DETAILED DESCRIPTION OF VARIOUS EMBODIMENTS

Figure 1:
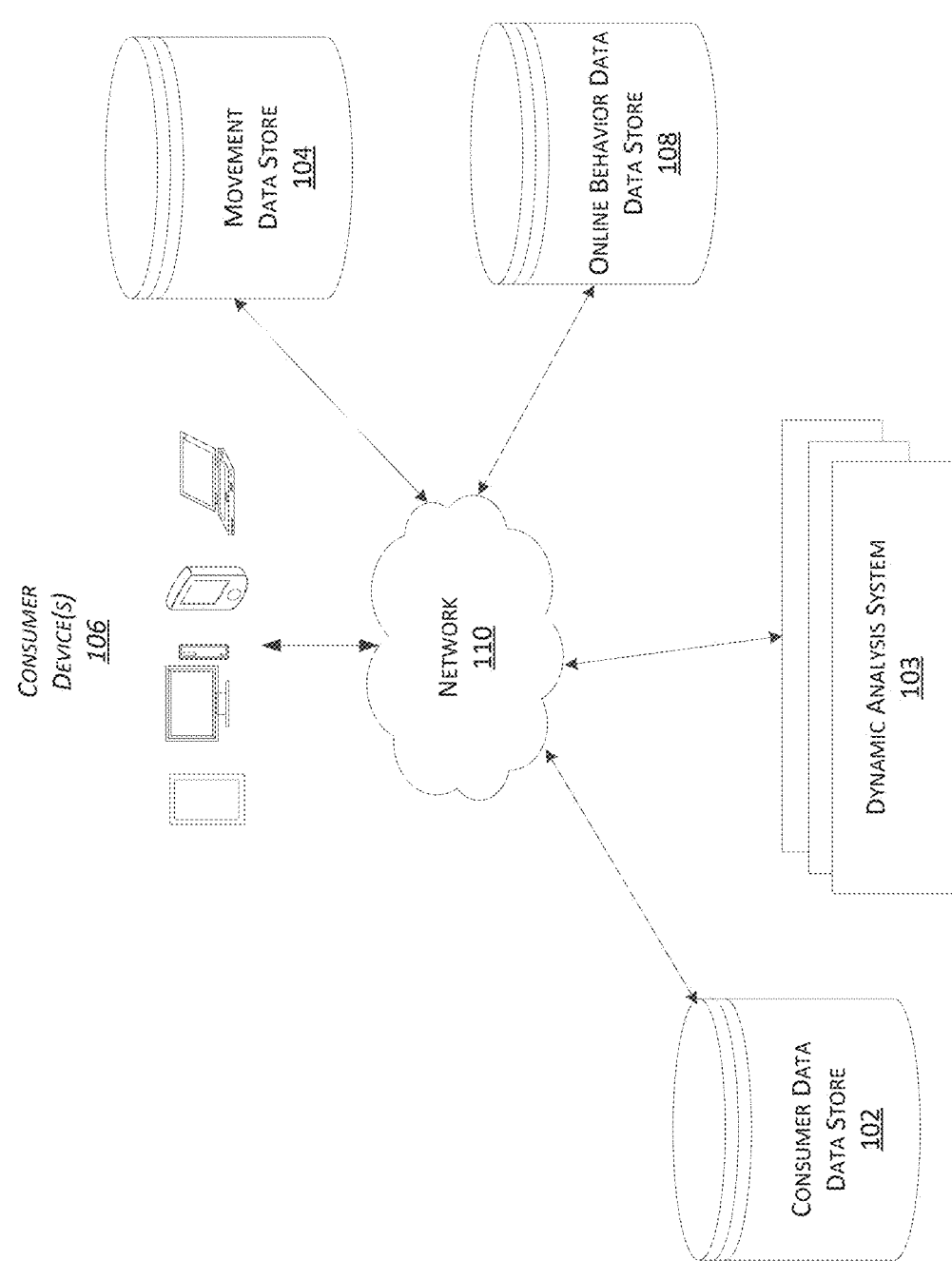
FIG. 1 illustrates an embodiment of one possible organization of a system that can dynamically identify and aggregate information regarding entity movement, mobile device usage, and Internet browsing history for generating and providing targeted information for entity consumption.

In the current age of technology and as smart devices are more closely integrated with daily lives of people across the globe, data is quickly becoming more valuable. This includes data relating to an entity's movement or travel, the entity's use of software and applications on its mobile device, and browsing, searching, usage history from one or more devices. However, while such data may exist, there are technology challenges for collecting sets of raw data that represent such activities and then being able to utilize such data. Accordingly, new systems, devices, and methods are needed.

The present disclosure relates to systems and methods for providing a tracking platform where embodiments may include features for identifying locations traveled to by an entity based on tracking movement patterns of the entity's mobile device, tracking usage of the entity's mobile device, or tracking the entity's browsing, searching, or usage history. Embodiments of the systems and methods described herein may use the identified and tracked information to generate targeted data packages and selection commands for placing targeted data for the entity's consumption.

Embodiments of systems include components that efficiently and effectively gather, identify, or track data from disparate systems, electronic analytic tools for analyzing such data, decision engines for automatically generating targeted data feeds, and communication portals that integrate with existing platforms that can provide targeted advertisements or messaging. Embodiments of the analytic tools and decision engines are configured to generate customized instructions for providing delivery packages to an entity in a manner that increases likelihood of being consumed and/or acted upon by the entity.

Although certain embodiments and examples are disclosed herein, subject matter extends beyond the specifically disclosed embodiments to other alternative embodiments and/or uses and to modifications and equivalents thereof. Thus, the scope of the application is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview of Embodiments

Embodiments of the present disclosure relate to systems and methods (for example, a database system and/or method, also herein referred to as "the system) for integrating data from remote devices and disparate data systems, and dynamically generating customized data to be electronically delivered to entities based on the integrated data. In some embodiments, the data from the remote devices may include information about the entity using the remote devices (for example, name, address, e-mail address, identifier, and so forth). In some embodiments, the data from the remote devices may include location data (for example, geographic location data) of the remote devices, Internet browsing data, online activity data, Internet of Things (IoT) data, remote device application data (for example, software applications that run on the remote devices), and entity usage information for the remote devices. In some embodiments, the customized data may include electronic notifications (also referred to herein as "notifications" or "alerts) to the entities based on dynamically received data.

Subsets of the data from the remote devices may be processed, updated, and compared with data from other remote devices associated with the same entity and/or other entities. For example, data from a mobile remote device of an entity may be processed, updated, linked, associated, and/or compared with data from a desktop computer or tablet device of the entity. In some embodiments, the data from the remote devices may be merged and/or aggregated with existing data from the same entity and/or other entities. For example, the data from the mobile remote device of the entity may be merged and/or aggregated with the data from the desktop computer of the entity and/or data from one or more devices (remote or otherwise) of one or more other entities. In addition, the data from the remote devices (either aggregated for just the single entity or aggregated with those for a number of entities) may be used to identify subject matter for the customized data. In some embodiments, the data from the remote devices may be used to determine where to place the customized data and/or how to make the customized data accessible to the entity to ensure consumption of and/or interaction with the customized data by the entity. The aggregation of the data from the entity with data from other entities may improve the generation of customized data, for example, improving relevance of the customized data to the entity, and so forth. Additionally, the aggregation of the data may improve how to make the customized data accessible to maximize or increase the likelihood of consumption and/or interaction by the entity.

In some embodiments, systems are configured to provide improved advertisement placement and for improved generation of targeted advertisements. The systems may deliver electronic data packages which include targeted advertisement data and personalized product recommendations to an entity based on the entity's online behavior data (OBD), mobile device usage, and/or physical movement. The system may include components for generating artificial intelligence, machine learning, decision trees, and/or other algorithms based on collected entity data and historical data to build models or predictive analytic engines that can then be fed information about an entity to identify correlations and advertising recommendations. Such information may include one or more of: an entity's online browsing history and/or other online profile information (such as app use, online purchases, advertisement clicks, and so forth) and/or information regarding where the entity is traveling to identify correlations between the entity's OBD and the entity's physical movement. In some embodiments, the system may recommend dynamic targeting advertisements that reflect changes in the entity's preferences, new products that may be of interest to the entity based on the entity's OBD and physical movements and determine how to best present the advertisements to maximize or increase "adoption" by the entity (such as whether to display as a social media ad or in search engine ad space).

Embodiments of the present disclosure address the highly technical problem of integrating large, disparate data sets, which are constantly being updated as well as the problem of providing accurate linking tools for linking or associating data from different sources which relate to the same entity. Embodiments of the systems also address the problem of analyzing records among the different data sets (for example from different remote devices for the same entity or from different entities) without overconsuming too many processing or memory resources. In addition, embodiments of the present disclosure address the highly technical problem of associating physical movements and entity's OBD and generating targeting advertisements while addressing differences and/or similarities among the records in the data sets.

Embodiments of the system may allow advertisers to identify the most suitable methods and/or avenues (for example, websites and mobile apps) for reaching both existing and prospective customers for new and/or existing products based on the actions and movements of the existing and prospective customers. Advertisers may be able to provide pre-curated content, utilize a dashboard to set thresholds for the match of the candidate to an ideal consumer, the predicted strength of specific advertisements, or the value of a recommended channel selection.

Embodiments of the system may enable various entities (for example, pharmaceutical companies, medical insurance or health care providers, and so forth) to determine web sites and mobile apps most visited, used, or preferred by their customers and prospective customers. Embodiments may also offer recommendations for supply (publisher) side vendors to offer dynamic placement of advertisements for customers coming from various source websites. The embodiments generate various machine learning (ML) and artificial intelligence (AI) algorithms to datastores that include, among other information, OBD, and movement data. The embodiments may generate reports that are dynamic as domain and app preferences of customers and/or prospective customers change to reflect various factors (such as weather, seasonal changes, new developments, and so forth). For example, the embodiments are designed to scale and offer dynamic targeting properties to reflect the change in individual preferences, new products entering into market, seasonality factors, and historical performance of the model and digital campaigns, among other factors. The information generated by the embodiments may be used for strategic planning and/or management of digital campaigns.

Example Use Case

It is recognized that the system may be utilized in a variety of verticals and use cases, such as, for example, education, healthcare, pharmacy, fitness, vehicle sales/leases, consumer products, clothing/apparel, sports activities/equipment, media, construction, beverages, pets, home goods, grocery, jewelry/accessories, real estate, investment vehicles, restaurants, travel and/or vacation products and/or services, financial services, personal services, and so forth. However, the following provides one example embodiment of a use case where the system provides targeted tracking within the dermatology industry and to provide various messages and types of messages. Such messages may include advertisements, instructions, updates, notifications, and the like.

For example, in one vertical of skin care, a consumer's OBD includes many searches regarding skin care products, researching of dermatologist reviews, and purchases of particular skin care (or similar) products. The system also receives data from one or more third parties that include historical tracking data, such as consumer's location data from the consumer's cell phone and tablet, as well as vehicle tracking data, to determine that the consumer made many trips to different dermatologists' offices and beauty product brick-and-mortar stores. The system also receives data from one or more third parties that the system aggregates and analyzes to determine that the consumer spends on average of 90 minutes a day on the Facebook app during the weekdays and has an ad click-through rate of 20% and that the consumer spends on average of 30 minutes a day during the week using the Google Chrome browser. The system ingests this data and applies the analytics module to determine that the consumer has met a threshold score of being a strong candidate for dermatology-related information. The system also utilizes the decision engine to dynamically score and/or identify one or more pre-stored targeted advertisements that the consumer may be interested in (for example, a new skin care product that is similar to those researched and/or purchased or that is endorsed by one or more of the dermatologists that the consumer visited or a new dermatology office that recently opened within the area that the consumer travels regularly). The system may also use the selection engine to score a recommended electronic channel that may be used to determine where to place the advertisement to promote viewing by the consumer and increase likelihood that the consumer will click on the advertisement, based on historical information, among other factors.

Placement of the advertisement (or other messaging) may include, for example, determining whether to place the advertisement on a social media website versus a retail website versus a web search website. Alternatively, or additionally, placement of the advertisement may include determining whether to place the advertisement on a website accessible via a mobile device versus a desktop or that is accessible via a vehicle or online assistant.

Example Tracking Analytics Platform

FIG. 1 illustrates one embodiment of tracking analytics platform (or platform) 100 that dynamically identifies and aggregate information regarding entity movement, mobile device usage, and Internet browsing history for generating and providing targeted information for entity consumption. The platform 100 comprises a dynamic analysis system 103, a consumer data datastore 102, an OBD datastore 108, a movement datastore 104, and a set of consumer devices 106. Each of these components include interfaces that allow for electronic communication with other systems over a network 110. Additionally, communication links (not individually numbered) are shown enabling communication among the components of platform 100 via the network 110.

Dynamic Analysis System

The dynamic analysis system 103 may comprise any computing device configured to transmit and receive data and information via the network 110. In some embodiments, platform 100 may be operated by an entity to provide information to customers or clients. The customers or clients may be individual persons or an institution such as a business, a non-profit organization, an educational institution, health care client, a pharmaceutical company, a medical insurance or health care provider, an automobile dealer, a vehicle manufacture, a financial institution, and so forth. In some embodiments, the dynamic analysis system 103 comprises one or more computing devices. In some embodiments, the dynamic analysis system 103 includes electronic interfaces or portals that allow access to the consumer datastore 102, the movement datastore 104, and the OBD datastore 108, locally or via the network 110. The dynamic analysis system 103 may collect data from the datastores, aggregate the collected data, and link related entities within the aggregated data. The dynamic analysis system 103 may also include a model generation system for generating artificial intelligence components for predicting entity actin, a model application system for applying one or more artificial intelligence components to an entity data set, an analytics engine or module to determine whether an entity's data meets a threshold. The dynamic analysis system 103 may also utilize a decision engine to dynamically score and/or identify one or more pre-stored targeted advertisements that the entity may be interested in. The dynamic analysis system 103 may also use a selection engine to score a recommended electronic channel that may be used to determine where to place the advertisement to promote viewing and/or access by the entity. Further, the dynamic analysis system 103 may generate one or more reports and/or targeted and/or customized information regarding consumption by consumers or for consumption by a client. The dynamic analysis system 103 may also generate the targeted and/or customized data packages information based on the data sets associated with a single consumer and/or with a consumer segment and provide automated delivery of such packages to third party platforms (such as, for example, an advertising entity, an application that includes electronic advertising, an advertisement auction house, and so forth) to be ingested by one or more consumers.

In various embodiments, the dynamic analysis system 103 ingests large amounts of data dynamically and analyzes them in response to user inputs, such that the analyzed data is efficiently and compactly presented to a user. Thus, in some embodiments, the data processing and generating of user interfaces described herein are more efficient as compared to previous data processing and user interfaces generation in which data and analyses are not dynamically updated and compactly and efficiently presented to the user in response to interactive inputs.

Consumer Datastore

The consumer datastore 102 may comprise one or more databases or datastores and may store data regarding consumers. In some embodiments, the consumer datastore 102 may include records associated with various consumers. The records may include data regarding the consumers (for example, names, addresses, phone numbers, and so forth) and identifiers to associate consumers in other datastores. For example, the records may associate the consumers with corresponding mobile identifiers and/or OBD identifiers. It is recognized that in some embodiments, the consumer datastore 102 includes personal information of consumers (for example, data where the consumer has given express permission for the storage and use of such data), but in other embodiments, the consumer datastore 102 may include other information about consumers without storing any personally identifiable information.

Movement Datastore

The movement datastore 104 may comprise one or more databases or datastores and may store data regarding physical movement of any consumer. In some embodiments, the movement datastore 104 comprises records of where the consumer traveled based on records from a mobile device (for example, of the consumer device 106) or from a third party associated with the mobile device (for example, a mobile phone company or the like). In some embodiments, the movement datastore 104 comprises records from a vehicle system (for example, a car navigation system), from an app server (for example, server-stored data from a mobile or other navigation app used by a consumer), from a social media server (for example, "check-in" data that the consumer has provided a social media server). In some embodiments, the physical movement records in the movement datastore 104 may be obtained from the mobile device itself or from one or more apps on the mobile device. In some embodiments, the records in the movement datastore 104 include location information, time information, consumer identifiers, and the like. In some embodiments, the location information may include GPS or similar location data, identifiers for businesses, addresses, and the like associated with the location data, and so forth.

OBD Datastore

The OBD datastore 108 may comprise one or more databases or datastores and may store data regarding consumer online behavior. In some embodiments, the OBD datastore 108 may include data associated with various consumers. The records may include data regarding browsing history for the consumers (for example, websites visited, social media sites visited and/or posts generated, accounts accessed, and so forth), search history, application usage information, phone or messaging usage, or device usage information. The OBD datastore 108 may also include identifiers to associate consumers to corresponding data in other datastores. For example, the records may include OBD identifiers that associate consumers to the records in other datastores (such as the consumer datastore 102 and the movement datastore 104).

In some embodiments, one or more of the datastores described herein may be combined into a single datastore that is local to the dynamic analysis system 103 or another component not currently shown. Additional datastores not shown may be integrated with the platform 100. In some embodiments, two or more of the components of platform 100 described above may be integrated. In some embodiments, one or more of the components may be excluded from platform 100 or one or more components not shown in FIG. 1 may be included in the platform 100. The platform 100 may be used to implement systems and methods described herein.

The OBD may include details of websites visited by the consumer, ads clicked on or viewed, social media posts or comments made, and/or online accounts accessed, among others. In some embodiments, the OBD analyzed may be associated with one or more categories, for example a behavioral category, a consumer retail/consumer category, an activity category, and/or demographics for the consumer (for example, age, ethnicity, Mosaic® segment, and so forth). An ability to analyze and associate the OBD across such segments may allow clients to identify differences specific to groups of consumers.

In some embodiments, the OBD includes details regarding applications (for example, mobile device apps or computer programs, and so forth) that the consumers use. For example, the OBD may include names of mobile apps on the consumer's mobile device. The OBD from various consumers and/or consumer segments may be analyzed and/or compared to identify any overlapping apps and/or corresponding usage. Such analysis may be used to make associations between consumers and/or consumer segments and/or identify how different consumers or segments have same/different preferences.

Thus, the OBD may be used as a tool for analyzing consumer and/or consumer segment behavior and further for predicting and/or generating targeted content for particular consumers and/or consumer segments.

The OBD may include "transaction data" or "event data" which can includes data associated with any event, such as an interaction by a user device with a server, website, database, and/or other online data owned by or under control of a requesting entity, such as a server controlled by a third party, such as a merchant. Transaction data may include merchant name, merchant location, merchant category, transaction dollar amount, transaction date, transaction channel (for example, physical point of sale, Internet, and so forth) and/or an indicator as to whether or not the physical payment card (for example, credit card or debit card) was present for a transaction. Transaction data structures may include, for example, specific transactions on one or more credit cards of a user, such as the detailed transaction data that is available on credit card statements. Transaction data may also include transaction level debit information, such as regarding debit card or checking account transactions. The transaction data may be obtained from various sources, such as from credit issuers (for example, financial institutions that issue credit cards), transaction processors (for example, entities that process credit card swipes at points of sale), transaction aggregators, merchant retailers, and/or any other source. Transaction data may also include non-financial exchanges, such as login activity, Internet search history, Internet browsing history, posts to a social media platform, or other interactions between communication devices. In some implementations, the users may be machines interacting with each other (for example, machine-to-machine communications). Transaction data may be presented in raw form. Raw transaction data may include transaction data as received by the transaction processing system from a third-party transaction data provider. Transaction data may be compressed. Compressed transaction data may refer to transaction data that may be stored and/or transmitted using fewer resources than when in raw form. Compressed transaction data need not be "uncompressible." Compressed transaction data preferably retains certain identifying characteristics of the user associated with the transaction data such as behavior patterns (for example, spend patterns), data cluster affinity, or the like.

Network

In some embodiments, the network 110 may comprise one or more wired or wireless communication networks via which data and/or information may be electronically communicated among multiple electronic and/or computing devices. The wireless or wired communication networks may be used to interconnect nearby devices or systems together, employing widely used networking protocols. The various aspects described herein may apply to any communication standard, such as a wireless 802.11 protocol.

Consumer Devices

The consumer device 106 comprises any computing device configured to transmit and receive data and information via the network 110 (for example, a smart phone, a personal digital assistant, a laptop, a personal computer, a tablet, a smart watch, a car console, or a media player). In some embodiments, the computing device 106 stores data and/or records in one or more datastores. In some embodiments, the computing device 106 performs analysis of the transmitted and received data and information and/or performs one or more actions based on the performed analysis and/or the transmitted and received data and information. In some embodiments, the computing devices 106 comprise mobile or stationary computing devices. In some embodiments, the computing device 106 may be integrated into a single terminal or device. In some embodiments, when the computing device 106 provides access to the platform 100 for customers and/or clients requesting information from the platform 100.

Analytics and Reporting

Further, as described herein, the platform 100 may be configured and/or designed to generate output data and/or information useable for rendering the various interactive user interfaces or reports as described. The output data may be used by platform 100, and/or another computer system, device, and/or software program (for example, a browser program), to render the interactive user interfaces or reports. The interactive user interfaces or reports may be displayed on, for example, electronic displays (including, for example, touch-enabled displays).

The various embodiments of interactive and dynamic data processing and output generation of the present disclosure are the result of significant research, development, improvement, iteration, and testing. This non-trivial development has resulted in the targeted content generation and placement described herein, which may provide significant efficiencies and advantages over previous systems. Such systems and methods provide improved human-computer and computer-computer interactions that may reduce workloads, improve predictive analysis, and/or the like.

In some embodiments, output data or reports may be presented in graphical representations, such as visual representations, such as charts, spreadsheets, and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, for example, forecast, future developments.

Various embodiments of the present disclosure provide improvements to various technologies and technological fields. For example, as described above, existing data storage and processing technology (including, for example, in memory databases) is limited in various ways (for example, manual data review is slow, costly, and less detailed; data is too voluminous; and so forth), and various embodiments of the disclosure provide significant improvements over such technology. Additionally, various embodiments of the present disclosure are inextricably tied to computer technology. In particular, various embodiments rely on detection of user inputs via graphical user interfaces, acquisition of data based on those inputs, analysis and/or comparing of data to generate dynamic outputs based on those user inputs, automatic processing of related electronic data, and presentation of output information via interactive graphical user interfaces or reports. Such features and others (for example, processing and analysis of large amounts of electronic data) are intimately tied to, and enabled by, computer technology, and would not exist except for computer technology. For example, the interactions with data sources and displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Tracking Analytics Platform Processes

Figure 2:
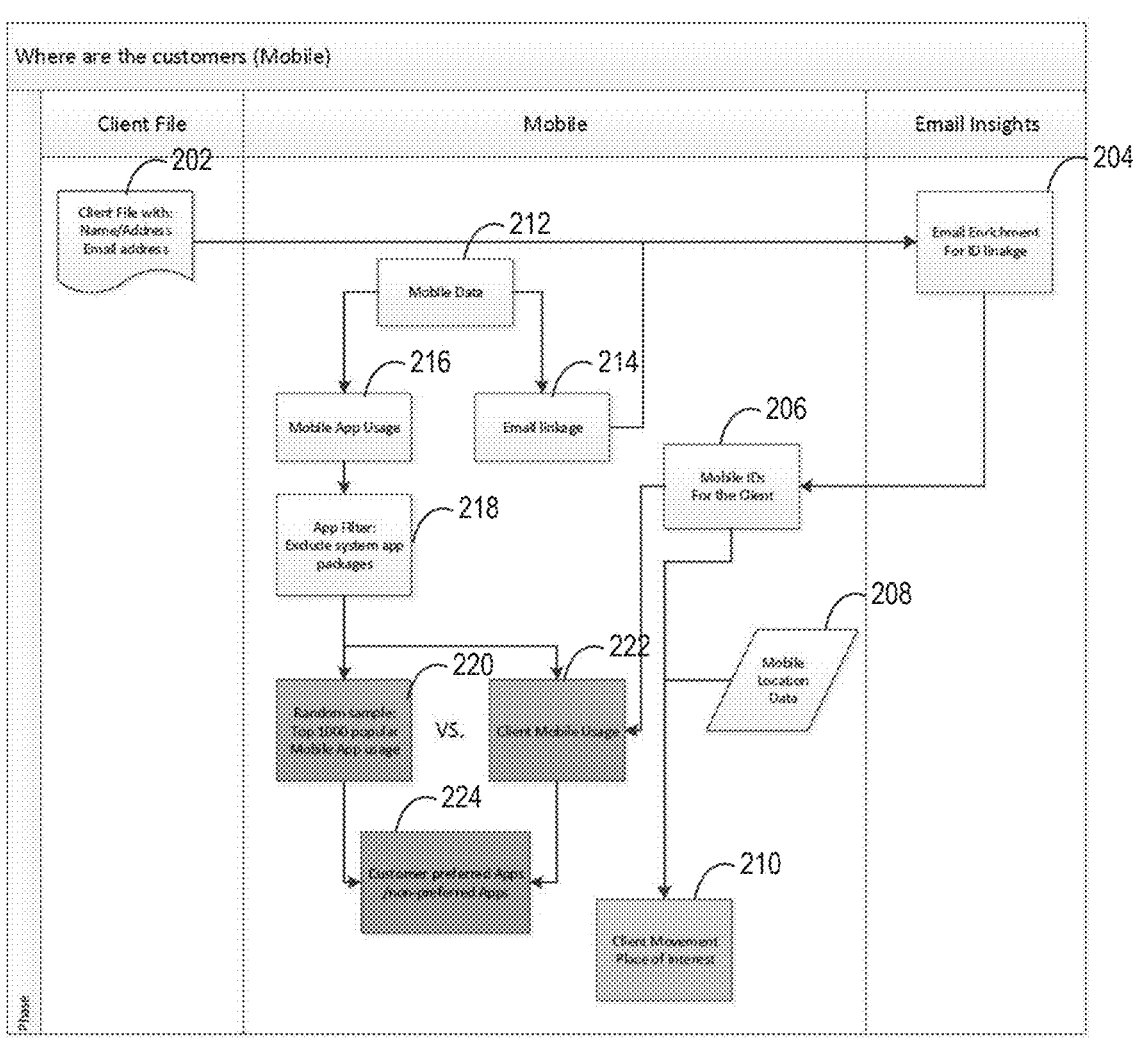
FIG. 2 is an embodiment of a block or data flow diagram corresponding to data identified and/or aggregated in the system of FIG. 1.

FIG. 2 is a block or data flow diagram corresponding to data identified and/or aggregated in the platform 100 of FIG. 1. The flow diagram shows that at block 202, data from a consumer file may be used to identify links associated with the consumer file. For example, at block 204, data from the consumer file is linked to identifiers associated with the consumer, for example using e-mail identifiers or other linking identifiers. Alternatively, data from the consumer file at block 202, including a consumer name and/or address, may be used to identify linking identifiers to a particular consumer identified in the consumer file.

Based on the linking identifiers at block 204, one or more mobile identifiers associated with the consumer in question are identified at block 206. In some embodiments, the mobile identifiers may be associated with devices used by the consumer, for example a mobile phone, laptop computer, and the like. At block 208, mobile location data associated with one or more of the mobile identifiers is provided and used to track movement, for example to a location or place of interest) of the consumer at block 210.

Figure 3:
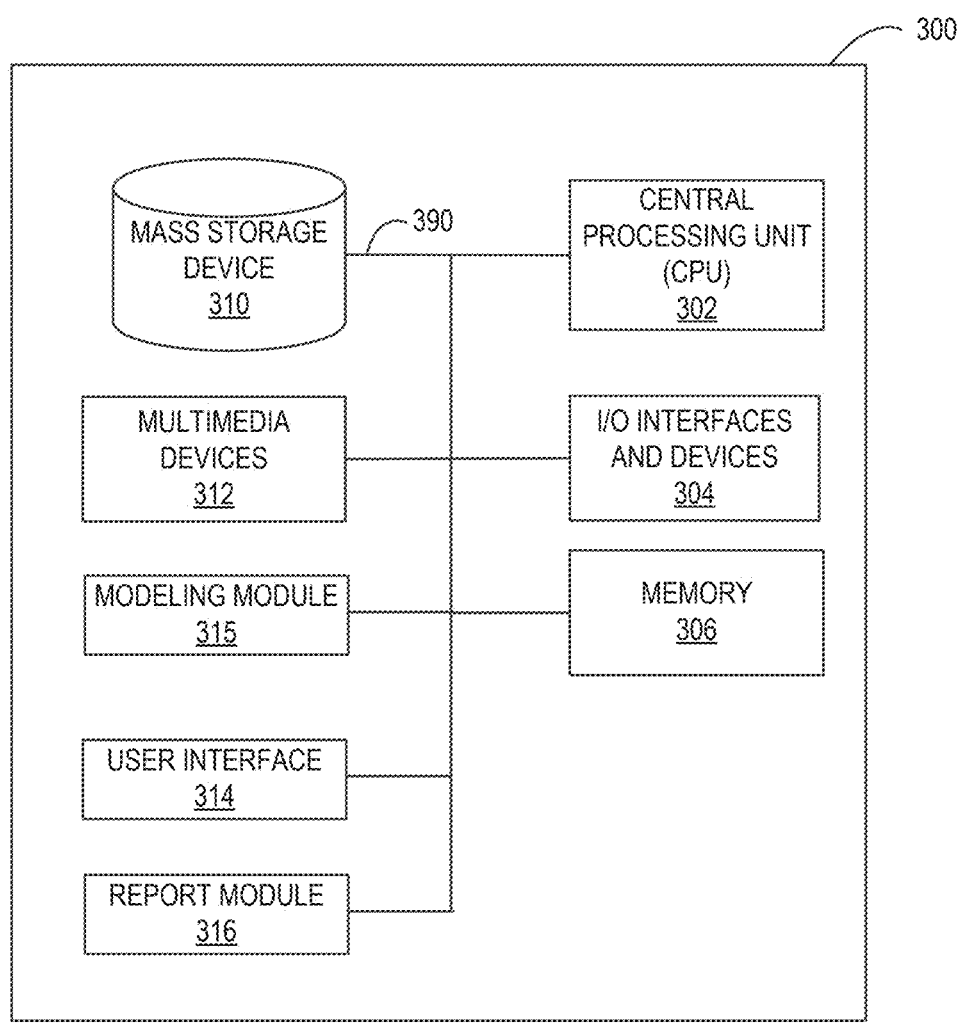
FIG. 3 is a block diagram corresponding to an aspect of a hardware and/or software component of an example embodiment of a device in the system of FIG. 1.

At block 212, mobile data is received from one or more mobile devices belonging to the consumer. At block 214, at least some of the data and/or information from the mobile data of the consumer devices is stored and/or identified as linkage data for use at the block 204. In some embodiments, the linkage data includes mobile device or similar data. For example, the linkage data includes Hashed Emails (HEMs), an operating system (for example, iOS Identifier For Advertising (for example, IDFA) or Android Advertising ID (AAID)), or an internet protocol (IP) address, or so forth. At block 216, application usage data for the mobile device is collected. In some embodiments, the application usage data may include names of applications stored on the mobile device, frequency of usage of the applications, data used in association with the applications, and so forth. At block 218, data (for example, from system application packages, data including person identifying information (PII), or similar data) may be excluded and/or filtered out. At block 220, the filtered application data may be used to identify whether any of the applications on the consumer's mobile device is one of the top 1000 popular mobile applications or top 1000 most used mobile applications. At block 222, the mobile application usage data that is filtered is combined with the consumer mobile use data to identify mobile device usage by the consumer. In some embodiments, this usage may comprise browsing information, mobile accounts accessed, and so forth. At block 224, the consumer preferred applications and non-preferred applications are identified based on the mobile usage data from block 222 and the mobile application usage data from block 220. In some embodiments, the consumer preferred applications data from block 224 and the consumer movement data from block 210 can be analyzed together or separately. In some embodiments, the data for the consumer can be combined with data for consumers from segments. In some embodiments, the data from the blocks 224 and 210 is used to identify consumers for specific segments. In some embodiments, the data from the blocks 224 and 210 is analyzed by the models and/or machine learning described herein to identify custom advertisements and/or advertisement locations for the consumer. FIG. 3 includes an embodiment of an example embodiment of a dataflow showing the dataflow including stages or phases related to online behavior data, online categories, data science team, enrichment team, linkage, opt-outs, and so forth.

Example Term Descriptions

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide example definitions.

The term "data store" or "datastore" includes any computer readable storage medium and/or device (or collection of data storage mediums and/or devices). Examples of datastores include, but are not limited to, optical disks (for example, CD-ROM, DVD-ROM, and so forth), magnetic disks (for example, hard disks, floppy disks, and so forth), memory circuits (for example, solid state drives, random-access memory (RAM), and so forth), and/or the like. Another example of a datastore is a hosted storage environment that includes a collection of physical data storage devices that may be remotely accessible and may be rapidly provisioned as needed (commonly referred to as "cloud" storage).

The term "database" includes any data structure (and/or combinations of multiple data structures) for storing and/or organizing data, including, but not limited to, relational databases (for example, Oracle databases, MySQL databases, and so forth), non-relational databases (for example, NoSQL databases, and so forth), in-memory databases, spreadsheets, as comma separated values (CSV) files, extendible markup language (XML) files, TeXT (TXT) files, flat files, spreadsheet files, and/or any other widely used or proprietary format for data storage. Databases are typically stored in one or more datastores. Accordingly, each database referred to herein (for example, in the description herein and/or the figures of the present application) is to be understood as being stored in one or more datastores.

The term "database record" and/or "record" includes one or more related data items stored in a database. The one or more related data items making up a record may be related in the database by a common key value and/or common index value, for example.

The term "event notification," "notification," and/or "alert" includes any electronic notification sent from one computer system to one or more other computing systems. For example, a notification may indicate a new record set or changes to one or more records of interest. Notifications may include information regarding the record change of interest, and may indicate, for example, to a user, an updated view of the data records. Notifications may be transmitted electronically, and may cause activation of one or more processes, as described herein. Further, notifications can be based on a push system (where notifications are sent out by the system without any request) and/or a pull system (where notifications are generated and made available such that another component or system accesses them)

The term "entity" includes a person, such as an individual, consumer, or customer, and/or may refer to an entity that provides input to the system and/or an entity that utilizes a device to receive the event notification, notification or alert (for example, a user who is interested in receiving notifications upon the occurrence of the newly generated record set or changes to records of interest). Thus, in the first context, the terms "user," "individual," "consumer," and "customer" should be interpreted to include single persons, as well as groups of users, such as, for example, married couples or domestic partners, organizations, groups, and business entities. Additionally, the terms may be used interchangeably. In some embodiments, the terms refer to a computing device of a user rather than, or in addition to, an actual human operator of the computing device. An entity may generally refer to one party involved in a transaction. In some implementations, an entity may be a merchant or other provider of goods or services to one or more users, a financial institution, a bank, a credit card company, an individual, a lender, or a company or organization of some other type.

The term "model" includes an artificial intelligence, machine learning, neural network, decision tree, or other construct which may be used by the transaction processing system to automatically generate a result or outcome. A model may be trained. Training a model may include implementing an automated machine learning process to generate the model that accepts an input and provides a result or outcome as an output. A model may be represented as a data structure that identifies, for a given value, one or more correlated values. For example, a data structure may include data indicating one or more categories. In such implementations, the model may be indexed to provide efficient look up and retrieval of category values. In other embodiments, a model may be developed based on statistical or mathematical properties and/or definitions implemented in executable code without necessarily employing machine learning.

Dynamic Analysis System

FIG. 3 is a block diagram corresponding to one embodiment of a device 300 used to implement the dynamic analysis system 103 of the platform 100. The illustrated device 300 includes a modeling module 315, a report module 316, and a user interface module 314. The device 300 also includes one or more of a central processing unit 302 (CPU or processor), input/output interfaces and devices 304, a mass storage device 310, multimedia devices 312), and one or more communication channels 390, such as, for example a bus. The hardware and/or software components may be used to implement one or more features of the systems and methods described herein. Further, in some embodiments, one or more modules described below, such as a user interface module 314, or a report module 316 may be included with, performed by, or distributed among different and/or multiple devices of the platform 100. For example, certain user interface functionality described herein may be performed by the user interface module 314 of various devices such as the computing device 106.

In some embodiments, the various modules described herein may be implemented by either hardware or software. In an embodiment, various software modules included in the device 103 may be stored on a component of the device 103 itself (for example, a local memory 306 or a mass storage device 310), or on computer readable storage media or other component separate from the device 103 and in communication with the device 300 via the network 110 or other appropriate means.

As shown in FIG. 3, the dynamic analysis system 103 includes the modeling module 315. As described herein, the modeling module 315 may generate one or more models for processing data obtained from the data stores or the user. In some embodiments, the modeling module 315 may also apply the generated models to the data to generate predicted features, scores, or measurements. In some embodiments, the one or more models may be stored in the mass storage device 310 or the memory 306. In some embodiments, the modeling module 315 may be stored in the mass storage device 310 or the memory 306 as executable software code that is executed by the processor 302. This, and other modules in the dynamic analysis system 103, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 1, the dynamic analysis system 103 is configured to execute the modeling module 315 to perform the various methods and/or processes as described herein. It is recognized that the instructions and components for generating models may be included in the dynamic analysis system 103 or may be stored and executed on a connected or remote system.

In some embodiments, the report module 316 may be configured to generate a report, notification, or output mentioned and further described herein. In some embodiments, the report module 316 may utilize information received from the dynamic analysis system 103, the data acquired from the data stores, and/or the user of the consumer device 106 (i.e., the consumer) to generate the report, notification, or output for a specific entity (for example, a client or customer establishing a marketing campaign and/or requesting information to improve return on marketing spend. For example, the dynamic analysis system 103 may receive information that the client via the network 110 that the dynamic analysis system 103 uses to acquire information from the data stores and generate models for processing of the information from the client and/or from the data stores. In some embodiments, the report module 316 may be used to apply the models and/or generate notification data packages, reports, or output that may include a data about website information visited, locations visited, device used, number of visits, purchase and/or transaction history, and other pertinent information for consumers that are of interest to the client (for example, current and/or potential consumers that do or would purchase products and/or services from the client). In some embodiments, the dynamic analysis system 103 may group or segment consumer-related data based on OBD of the consumers, locations visited by the consumers, other demographics of the consumers, and so forth. In some embodiments, the generated report, notification, or output does not include any personal identifying information (PII) of the consumers whose OBD and location data is tracked and/or analyzed. In some embodiments, the report data, may include a ranking or similar value for each potential consumer in the report or output, where the ranking or similar value corresponds to a confidence level that the corresponding consumer will access an advertisement directed to the consumer on one or more particular websites and/or locations. In some embodiments, the report module 316 may include information received from the client in the generated report, notification, or output.

The user interface module 314 may be configured to generate and/or operate user interfaces of various types. In some embodiments, the user interface module 314 constructs pages, applications or displays to be displayed in a web browser, computer/mobile application, or other interface channel. In some embodiments, the user interface module 314 may provide an application or similar module for download and operation on a computer or system through which the client may interface with the dynamic analysis system 103 to obtain the desired report or output. The pages or displays may, in some embodiments, be specific to a type of device, such as a mobile device or a desktop web browser, to improve usability for the particular device. In some embodiments, the user interface module 314 may also interact with a client-side application, such as a mobile phone application, a standalone desktop application, or user communication accounts (for example, e-mail, SMS messaging, and so forth) and provide data as necessary to display determinations.

For example, as described herein, the dynamic analysis system 103 may be accessible to the client (for example the healthcare provider) via a website or similar interface. The interface may request that the client provide details for the consumers that the client wishes to target with advertisements. This may include a request for particular segment to which the consumer(s) belong and/or details of the product and/or service that the client provides. In some embodiments, the user may select or opt out of receiving any report and just request a listing of websites.

After the dynamic modeling system 103 receives the user inputs (for example, identified consumer and/or segment information, product/service information, and so forth), the client user may view the received information via the I/O interfaces and devices 304 and/or the user interface module 314. Once the dynamic analysis system 103 receives the corresponding information from the data stores (for example, via the I/O interfaces and devices 304 or via the user interface module 314), the processor 302 or the modeling module 315 may store the received inputs and information in the memory 306 and/or the mass storage device 310. In some embodiments, the received information from the data stores may be parsed and/or manipulated by the processor 302 or the dynamic analysis system 103 (for example, filtered or similarly processed), before the generated models are applied to the information.

In some embodiments, one or more of the processors 302 and the modeling system 315 employs machine learning or similar algorithms and/or systems to generate models according to which customized advertisement (or messaging) content and location information can be selected or determined by the system. In some embodiments, the machine learning performed by and/or models applied by the system 100 and/or the dynamic analysis system 103 may make associations between a consumer's OBD and locations to which the consumer travels. For example, the machine learning may use information from the consumer in combination with consumers determined to be similar to the consumer (for example, consumers in the same consumer segment as the consumer) to generate and/or train models for analyzing the consumer's OBD and location information. In some embodiments, the machine learning continuously updates, improves, and trains the models used to associate consumer OBD and traveled to locations. For example, the models will be adapted to make stronger and better associations between OBD and locations based on identifying and/or reviewing previous OBD and locations traveled for a previous consumer and monitoring the previous consumer advertisement clicks to determine whether the customized advertisement content and/or placement was successful in soliciting access by the previous consumer. Such review may help the system 100 and/or the dynamic analysis system 103 to better predict custom content and/or locations for advertisements based on prior "successes" and "failures" from previous consumers.

As such, the machine learning performed by the system 100 and/or the dynamic analysis system 103 to gather data sources for the consumer OBD and the consumer location information and use the information from these data sources (and information for other consumers in a consumer group to which the consumer belongs) to build one or more models to predict the customized advertisement data and/or locations for the customized advertisement data.

The device 300 may comprise, for example, a computer that is IBM, Macintosh, or Linux/Unix compatible or a server or workstation or a mobile computing device operating on any corresponding operating system. In some embodiments, the device 300 interfaces with one or more third party systems, such as, for example, a smart phone, a personal digital assistant, a kiosk, a tablet, a smart watch, a car console, or a media player. In some embodiments, the device 300 may comprise more than one of these devices. The CPU 302 may control operation of the dynamic modeling system 103. The CPU 302 may also be referred to as a processor. The processor 302 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The I/O interface 304 may comprise a keypad, a microphone, a touchpad, a speaker, and/or a display, or any other commonly available input/output (I/O) devices and interfaces. The I/O interface 304 may include any element or component that conveys information to the user of the device 300, and/or receives input from the user. In one embodiment, the I/O interface 304 includes one or more display devices, such as a monitor, that allows the visual presentation of data to the consumer. More particularly, the display device provides for the presentation of GUIs, application software data, websites, web apps, and multimedia presentations, for example.

In some embodiments, the I/O interface 304 may provide a communication interface to various external devices. For example, the dynamic analysis system 103 and/or the consumer devices 106 may be electronically coupled to the network 110 (FIG. 1), which comprises one or more of a local area network (LAN), wide area network (WAN), and/or the Internet. Accordingly, the I/O interface 304 includes an interface allowing for communication with the network 110, for example, via a wired communication port, a wireless communication port, or combination thereof. The network 110 may allow various computing devices and/or other electronic devices to communicate with each other via wired or wireless communication links.

The memory 306, may include one or both of read-only memory (ROM) and random access memory (RAM), may provide instructions and data to the processor 302. For example, data received via inputs received by one or more components of the dynamic analysis system 103 and/or the consumer devices 106 may be stored in the memory 306. A portion of the memory 306 may also include non-volatile random access memory (NVRAM). The processor 302 typically performs logical and arithmetic operations based on program instructions stored within the memory 306. The instructions in the memory 306 may be executable to implement the methods described herein. In some embodiments, the memory 306 may be configured as a database and may store information that is received via the user interface module 314 or the I/O interfaces and devices 304.

The device 300 also includes the mass storage device 310 for storing software, data, or information (for example, the generated models or data obtained to which the models are applied, and so forth). Software may include any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein. Accordingly, the dynamic analysis system 103 and/or the consumer devices 106 may include, for example, hardware, firmware, and software, or any combination therein. The mass storage device 310 may comprise a hard drive, diskette, solid state drive, or optical media storage device. In some embodiments, the mass storage device may be structured such that the data stored therein is easily manipulated and parsed.

It is recognized that the hardware and/or software components, as discussed below with reference to the block diagram of the device 300 may be included in any of the components of the platform 100 (for example, the dynamic analysis system 103, the computing devices 106, and so forth). These various depicted components may be used to implement the systems and methods described herein.

Tracking Analysis Flow

Figure 4:
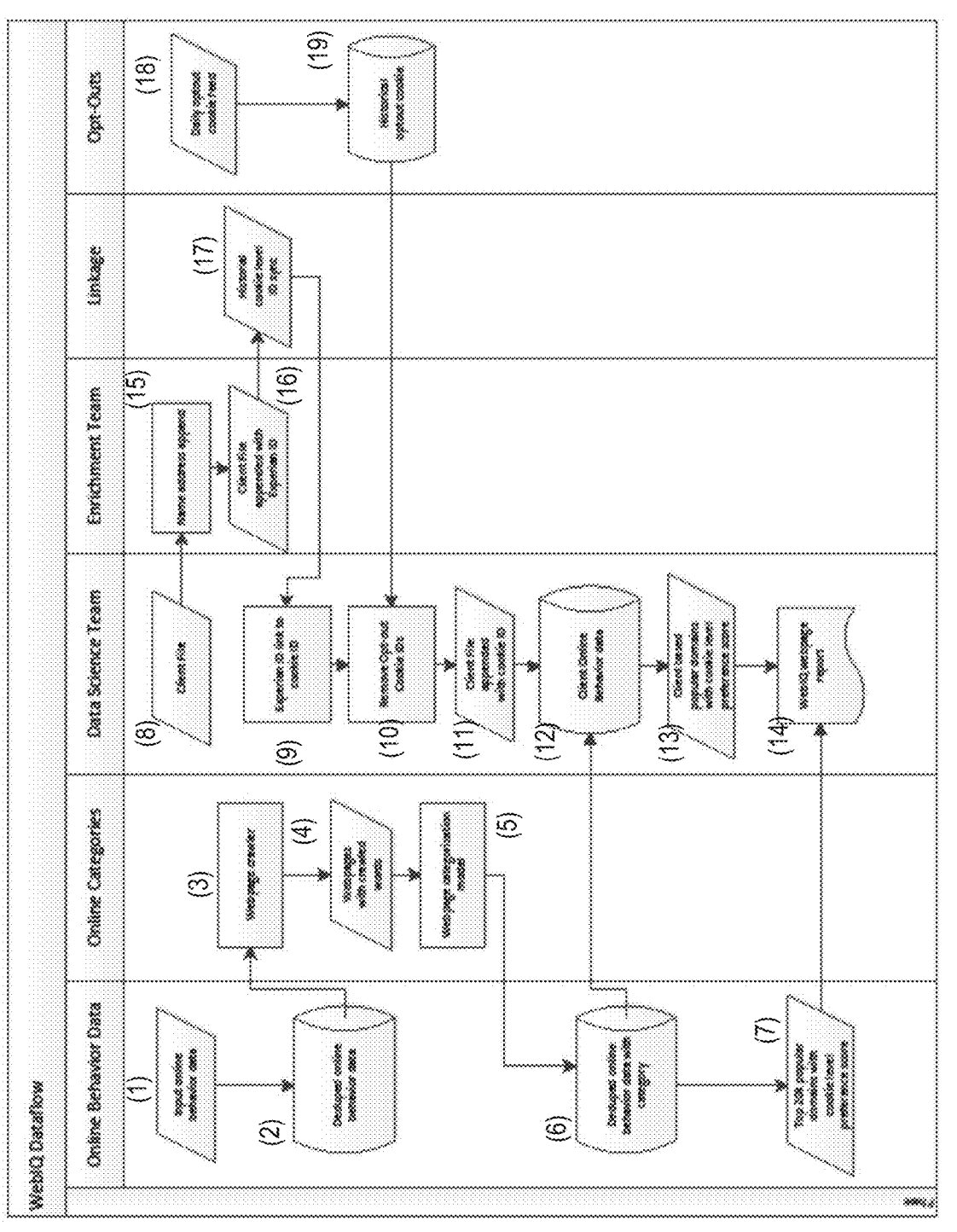
FIG. 4 is an embodiment of a block or data flow diagram corresponding to additional data identified and/or aggregated in the system of FIG. 1.

FIG. 4 is an embodiment of a block or data flow diagram corresponding to additional data identified and/or aggregated in the system of FIG. 1. The dataflow shows how a consumer's data (for example, OBD), can be analyzed and categorized before being combined and/or linked with other available data (for example, data for the same consumer or other consumers) to provide meaningful data to clients. Such meaningful data can include information that enables the clients to display advertisements, instructions, notifications, and other messages to consumers in a more informed manner with improved interaction rates.

In some embodiments, the system may be configured to define a domain universe (for example, the largest 20,000 domains from the online behavior data source(s) based on the number of unique living unit level identifiers that visited the domains). The system may append information to the client segments (for example, append domain visit information to the segments based on the living unit level identifier (LUID) information). The system may determine state level weighing for the segments (for example, creating weights so that the final geographic distribution of the segments appended with digital information reflect the underlying distribution of the digital universe). The system may calculate weighted indices for the segments (for example, using [(number of LUIDs visiting Domain A*weight/(Total LUIDs*weight)]/[% of universe visiting Domain A]. The system may eliminate local media domains (for example, using web-crawling and models to eliminate local news, or using domain matching logic to eliminate local newspapers and television stations). The system may eliminate duplicate domain names (for example, using the projected cookie count and major category information based on the largest domain record, and/or calculating the web index as the average among duplicate domains).

Example Reporting Analysis and Tools

In some embodiments, the platform 100 may enable the or clients to identify websites most visited and/or applications most used by their customers, for example on mobile devices and/or desktop or laptop computers. Such identification may be based, at least in part, on the OBD and/or other digital data sources that include data for these customers. The platform 100 may generate reports that provide such information. For example, the platform 100 may provide the clients with reports that are dynamically updated to reflect the dynamic nature of the OBD and similar data for their customers. In some embodiments, such data can be dynamic based on season, life conditions and/or developments, and the like. For example, domain profile and app profile reports may utilize customer OBD, daily activity information, and movement patterns for associated devices (for example, mobile and/or computing devices).

Analysis of this data and these reports can provide tools for planning and/or management of digital messaging campaigns. For example, the domain reports can provide profile information at a domain or website level of customer OBD that is specific to a particular segment. The reports may include details of domains or websites, one or more categories with which the behavior being analyzed is associated, and projected information for a number of hits or browses for corresponding websites or domains. The domain profile reports may include fewer or additional data, for example demographics information. The categories may be assigned using various algorithms and analytical techniques based on the information involved with the website.

Example Calculation of Penetration Indices

In some embodiments, a market or web penetration index is provided that measures or relates to a percentage of unique customers within a particular segment that visit the corresponding domain. For example, the domain (or web) index may be solved according to:

$$\text{Domain}_{ABC} \text{ Index} = [(\% \text{ of Client Households Visiting Domain}_{ABC})/(\% \text{ of Households Visiting Domain}_{ABC})]*100.$$

In some embodiments, weight information can be applied to help geographic distributions within the segments resemble the geographic distributions of the digital universe. This may minimize or reduce any locally-focused domains (such as newspapers and local television stations) from having artificially high indices due to underlying differences in geographic distributions between a client segment and the digital universe. A weighted example of the domain index is provided by:

$$\text{Domain}_{ABC} \text{ Index} = [(\% \text{ of Client Households Visiting Domain}_{ABC}\text{Weight})/(\% \text{ of Households Visiting Domain}_{ABC})]*100.$$

In some embodiments, some sources (such as, for example, local newspapers and local television stations) can also be excluded from the initial analysis based upon web crawling and the explicit exclusion of domains associated with such sources, where as other sources would not be excluded (such as, for example, newspapers that are considered national).

Example Cookie Projection

Furthermore, the domain reports may include cookie projection information that includes estimated cookie counts for the domains in the report. In some embodiments, the cookie counts estimate a number of unique visits to the domain or website in a particular month. Where cookie counts for different between sources, the higher value may be utilized as opposed to aggregating counts, although aggregation may be used in some embodiments. As one example, Partner 1 may provide mobile and non-mobile sources of URL page visits. When aggregating this information to the domain level, the system retains cookie count information associated with the maximum or high method of accessing the domain. For example, mobile website A may have 500,000 cookies and website A may have 250,000 cookies, the projected cookie count assigned to the overall website A domain is 500,000. A more conservative approach may be adopted to reduce the potential for over counting cookie activity. Alternate approaches can be used to provide other estimates regarding the actual number of cookies. Partner 2 may also provide information at the household level which the system extracts to the cookie level through an internal algorithm. When Partner 1 and Partner 2 have information on the same domains, the system may be configured to use the maximum or a high cooking count associated with either Partner 1 or Partner 2 to be incorporated into the report. However, is it recognized that alternate approaches may be used.

Example Domain Profile Report

An example snapshot of a domain profile report for a health care client that shows segments analyzed as well as some of the highest indexing domains is provided below in Table 1, where it is recognized that the domains, categories, and counts are simulated for example only. Detailed reports for both high and low indexing domains can be produced for each client and prospect segment.

TABLE 1

| Domain | Dominant Behavioral Category | Secondary Behavioral Category | Tertiary Behavioral Category | Projected Cookie Count (Monthly) | Web Index |
|---|---|---|---|---|---|
| morewithlesstoday.com | Shopping | Personal Finance | Food and Drink | 15,783 | 179 |
| 247solitaire.com | Hobbies and Interests | — | — | 87,412 | 176 |
| jewishjournal.com | News | Society | Sports | 35,885 | 169 |
| weightlossgroove.com | Health & Fitness | Arts and Entertainment | Society | 42,773 | 166 |

TABLE 1-continued

| Domain | Dominant Behavioral Category | Secondary Behavioral Category | Tertiary Behavioral Category | Projected Cookie Count (Monthly) | Web Index |
|---|---|---|---|---|---|
| cardgamesolitaire.com | Hobbies and Interests | — | — | 59,033 | 163 |
| 123freecell.com | Hobbies and Interests | — | — | 20,439 | 162 |
| microsoftcasualgames.com | Hobbies and Interests | — | — | 89,606 | 158 |
| 247sudoku.com | Hobbies and Interests | Society | | 30,425 | 157 |
| seniorcenter.us | Society | Careers | Hobbies and Interests | 20,315 | 157 |
| lohud.com | Society | News | — | 23,763 | 157 |
| joyofkosher.com | Food and Drink | Hobbies and Interests | Home and Garden | 42,674 | 157 |
| favequilts.com | Hobbies and Interests | Home and Garden | Food and Drink | 69,069 | 156 |
| quiltingboard.com | Hobbies and Interests | Home and Garden | Automotive | 54,854 | 153 |

The reports can be also broken-out by ethnicity, Mosaic segment, or other core demographics. This can enable clients to determine for example how domain preferences differ by ethnic group or Mosaic segment.

Example App Profile Report

Similarly, an App profile report may provide details of apps used by the customers, for example, including an app name and an app category. Such reports may be divided into or include different customer segments. The app profile report may be a tool enabling clients to understand the mobile behavior of segment customers. Some reports may include information regarding which apps sell advertising and the like. An example of an app profile report is provided below in Table 2, where it is recognized that the apps, categories, and counts are simulated for example only.

TABLE 2

| Customer Segment 1 | | | Customer Segment 2 | | |
|---|---|---|---|---|---|
| App Name | App Category | App Index | App Name | App Category | App Index |
| FollowMyHealth | Medical | 700 | 777 Slots - Free Casino | Casino Game | 505 |
| Michaels Stores | Shopping | 568 | Kohl's | Shopping | 451 |
| MyChart | Medical | 559 | Nextdoor - Local Neighborhood News | Social | 448 |
| GoodRx Drug Prices and Coupons | Medical | 542 | JCP Registry | Shopping | 442 |
| JOANN - Shopping & Crafts | Shopping | 526 | CVS/Pharmacy | Health & Fitness | 420 |
| Fetch Rewards: Grocery Savings | Shopping | 515 | AOL - News, Mail & Video | News & magazines | 412 |
| Ulta Beauty: Makeup & Skincare | Shopping | 511 | RetailMeNot: Save with Coupons | Shopping | 401 |
| Hobby Lobby Stores | Lifestyle | 506 | Southwest Airlines | Travel & Local | 400 |
| CVS/Pharmacy | Health & Fitness | 504 | Solitaire | Card Game | 398 |
| Ebates: Earn Cash Back Rewards | Shopping | 489 | MyChart | Medical | 395 |

The mobile app report may be implemented as a digital tool for understanding the mobile behavior of segment customers. Other embodiments of the mobile app report may include one or more of the following: information indicating which apps sell advertising in the marketplace, online behavior data that provides insight to user level online interests over time and across the different websites and applications, daily active apps data that moves the focus away from installed apps to those apps being used by customers or prospects (based upon app opening information), and/or mobile movement patterns data that includes mobile location data based upon mobile device ids is being evaluated to determine locations commonly visited by individuals such as Costco or other big-box retailers.

Example Platform and User Interfaces

The platform 100 may enable the clients to utilize an interface to review such reports and apply one or more algorithms to analyze the information therein. In some embodiments, the interface provided by the platform 100 enables the clients to incorporate additional information (for example, data from other sources, such as television viewing data) or additional reports for analysis with the reports provided by the platform 100. In some embodiments, the interfaces may be configure to allow the uploading/downloading of the domain and mobile app reports, to ensure compliance with legal, regulatory and security considerations, to provide high-level recommendations based upon web and app indices, and/or incorporating other exposure and transactional data sources such as television viewing data.

In some embodiments, the platform 100 may apply one or more processes to identify apps/websites/domains for inclusion in the reports described herein. The processes may include defining a domain universe based on application of an algorithm to determine the category information described above. The algorithm may aggregate page-level information to the domain level. The platform 100 may then append information to a segment in question or being analyzed before identifying weights for aspects of the segments, calculating weighted indices for the segments, eliminating local media domains, and eliminating duplicate domain names. These processes may ensure that the reports generated by the platform 100 do not include data driven by geographic differences.

In some embodiments, the segments of interest may include different domains of interest. For example, a migraine segment may focus on health-related, family-related, and activity lifestyle domains while having numbers of foreign or ethic domains. Similarly, an osteoporosis segment may focus on game-related, health-related, new-related, Israel-related, and political-related domains, among others, while not focusing on other domains.

Computing Systems

Any of the components or systems described herein may be controlled by operating system software, such as Windows XP, Windows Vista, Windows 7, Windows 8, Windows Server, UNIX, Linux, SunOS, Solaris, IOS, Android, Blackberry OS, or other similar operating systems. In Macintosh systems, the operating system may be any available operating system, such as MAC OS X. In other embodiments, the components or systems described herein may be controlled by a proprietary operating system. Conventional operating systems control and schedule computer processes for execution, perform memory management, provide file system, networking, I/O services, and provide a user interface, such as a graphical user interface (GUI), among other things.

Computing devices, which may comprise the software and/or hardware described above, may be an end user computing device that comprises one or more processors able to execute programmatic instructions. Examples of such computing devices are a desktop computer workstation, a smart phone such as an Apple iPhone or an Android phone, a computer laptop, a tablet PC such as an iPad, Kindle, or Android tablet, a video game console, or any other device of a similar nature. In some embodiments, the computing devices may comprise a touch screen that allows a user to communicate input to the device using their finger(s) or a stylus on a display screen.

The computing devices may also comprise one or more client program applications, such as a mobile "app" (for example, iPhone or Android app) that may be used to visualize data and initiate the sending and receiving of messages in the computing devices. This app may be distributed (for example downloaded) over the network to the computing devices directly or from various third parties such as an Apple iTunes or Google Play repository or "app store." In some embodiments, the application may comprise a set of visual interfaces that may comprise templates to display vehicle history reporting and financing information. In some embodiments, as described above, visual user interfaces may be downloaded from another server or service. This may comprise downloading web page or other HTTP/HTTPS data from a web server and rendering it through the "app". In some embodiments, no special "app" need be downloaded, and the entire interface may be transmitted from a remote Internet server to computing device, such as transmission from a web server to an iPad, and rendered within the iPad's browser.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the platform 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules but may be represented in hardware or firmware. Generally, the modules described herein refer to logical modules that may be combined with other modules or divided into sub-modules despite their physical organization or storage.

In some embodiments, the system distinguishes between the initial transmission of loan application data required for user interfaces, and subsequent transmissions of user interface data so that it may transmit only portions that are necessary to update a vehicle history reporting and financing user interface. This may be done, for example, using an XMLHttpRequest (XHR) mechanism, a data push interface, Asynchronous Javascript and XML ("Ajax"), or other communication protocols.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process blocks may be stored, persistently or otherwise, in any type of non-transitory computer storage such as, for example, volatile or non-volatile storage.

The various features and processes described above may be used independently of one another or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or blocks in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the vehicle history reporting and financing platform 100, marketing computing device 162, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The I/O devices and interfaces provide a communication interface to various external devices and systems. The computing system may be electronically coupled to a network, which comprises one or more of a LAN, WAN, the Internet, or cloud computing networks, for example, via a wired, wireless, or combination of wired and wireless, communication links. The network communicates with various systems or other systems via wired or wireless communication links, as well as various data sources.

Information may be provided to the platform 100 over the network 110 from one or more data sources including, for example, external or internal data sources 102, 104, and/or 108. In addition to the sources that are illustrated in FIG. 1, the network 110 may communicate with other data sources or other computing devices. The data sources may include one or more other internal or external data sources. In some embodiments, one or more of the databases or data sources may be implemented using an open-source cross-platform document-oriented database program, such as a Mongo dB, a relational database, such as IBM DB2, Sybase, Oracle, CodeBase and Microsoft® SQL Server as well as other types of databases such as, for example, a flat file database, an entity-relationship database, and object-oriented database, and/or a record-based database.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following.

What is claimed is:
1. A system comprising:
a non-transitory data store configured to store executable instructions; and
one or more computer processors configured to execute the executable instructions to:
access or receive consumer data regarding at least one consumer;
generate aggregated online behavior data by aggregating first online behavior data associated with the at least one consumer with online behavior data associated with thousands of other consumers;
update the aggregated online behavior data to exclude or filter out personally identifying information;
associate the aggregated online behavior data with a first population segment of a plurality of segments, wherein the first population segment is associated with a first vertical;
analyze the consumer data and the aggregated online behavior data associated with the first population segment to generate customer behavior data;
generate first predictive behavioral data based on the aggregated online behavior data associated with the first population segment and the customer behavior data;
generate a report of the first predictive behavioral data based on the aggregated online behavior data asso- ciated with the first population segment and the customer behavior data; and generate and electronically provide, to a remote device, a data package comprising the report.

2. The system of claim 1, wherein the one or more computer processors are further configured to execute the executable instructions to receive data associated with locations or movement of the at least one consumer.

3. The system of claim 1, wherein the first online behavior data comprises data associated with browsing and/or application data histories of the at least one consumer.

4. The system of claim 1, wherein the generation of the first predictive behavioral data is based at least in part on one or more behavioral categories associated with the aggregated online behavior data.

5. The system of claim 1, wherein behavioral categories for the online behavior data includes one or more of: shopping, sports, hobbies and interests, health and fitness, careers, society, or food and drink.

6. The system of claim 1, wherein the first vertical is a health-oriented vertical.

7. The system of claim 1, wherein the online behavior data comprises web site data and mobile application data.

8. The system of claim 1, wherein the customer behavior data comprises at least one of: custom information for the at least one consumer, or a location for presentation of information to the at least one consumer.

9. A computer-implemented method, as implemented by one or more computing devices configured with specific executable instructions to at least:

access or receive consumer data regarding at least one consumer;

generate aggregated online behavior data by aggregating first online behavior data associated with the at least one consumer with online behavior data associated with thousands of other consumers;

update the aggregated online behavior data to exclude or filter out personally identifying information;

associate the aggregated online behavior data with a first population segment of a plurality of segments, wherein the first population segment is associated with a first vertical;

analyze the consumer data and the aggregated online behavior data associated with the first population segment to generate customer behavior data;

generate first predictive behavioral data based on the aggregated online behavior data associated with the first population segment and the customer behavior data;

generate a report of the first predictive behavioral data based on the aggregated online behavior data associated with the first population segment and the customer behavior data; and generate and electronically provide, to a remote device, a data package comprising the report.

10. The computer-implemented method of claim 9, wherein the one or more computing devices are further configured with specific executable instructions to receive data associated with locations or movement of the at least one consumer.

11. The computer-implemented method of claim 9, wherein the first online behavior data comprises data associated with browsing and/or application data histories of the at least one consumer.

12. The computer-implemented method of claim 9, wherein the generation of the first predictive behavioral data is based at least in part on one or more behavioral categories associated with the aggregated online behavior data.

13. The computer-implemented method of claim 9, wherein behavioral categories for the online behavior data includes one or more of: shopping, sports, hobbies and interests, health and fitness, careers, society, or food and drink.

14. The computer-implemented method of claim 9, wherein the first vertical is a health-oriented vertical.

15. The computer-implemented method of claim 9, wherein the online behavior data comprises web site data and mobile application data.

16. The computer-implemented method of claim 9, wherein the customer behavior data comprises at least one of: custom information for the at least one consumer, or a location for presentation of information to the at least one consumer.

17. A non-transitory computer storage medium storing computer-executable instructions that, when executed by a processor, cause the processor to at least:

access or receive consumer data regarding at least one consumer;

generate aggregated online behavior data by aggregating first online behavior data associated with the at least one consumer with online behavior data associated with thousands of other consumers;

update the aggregated online behavior data to exclude or filter out personally identifying information;

associate the aggregated online behavior data with a first population segment of a plurality of segments, wherein the first population segment is associated with a first vertical;

analyze the consumer data and the aggregated online behavior data associated with the first population segment to generate customer behavior data;

generate first predictive behavioral data based on the aggregated online behavior data associated with the first population segment and the customer behavior data;

generate a report of the first predictive behavioral data based on the aggregated online behavior data associated with the first population segment and the customer behavior data; and generate and electronically provide, to a remote device, a data package comprising the report.

18. The non-transitory computer storage medium of claim 17, wherein the computer-executable instructions, when executed by the processor, further cause the processor to receive data associated with locations or movement of the at least one consumer.

19. The non-transitory computer storage medium of claim 17, wherein the first online behavior data comprises data associated with browsing and/or application data histories of the at least one consumer.

20. The non-transitory computer storage medium of claim 17, wherein the customer behavior data comprises at least one of: custom information for the at least one consumer, or a location for presentation of information to the at least one consumer.

* * * * *